(12) United States Patent
Katsuyama et al.

(10) Patent No.: US 10,359,811 B2
(45) Date of Patent: Jul. 23, 2019

(54) ELECTRONIC DEVICE HAVING DETACHABLE PARTS AND A DUST DISCHARGE MECHANISM

(71) Applicant: Panasonic Intellectual Property Management Co., Ltd., Osaka (JP)

(72) Inventors: Yusuke Katsuyama, Osaka (JP); Kenichi Shindo, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 16/030,783

(22) Filed: Jul. 9, 2018

(65) Prior Publication Data

US 2018/0314300 A1 Nov. 1, 2018

Related U.S. Application Data

(63) Continuation of application No. PCT/JP2017/002633, filed on Jan. 26, 2017.

(30) Foreign Application Priority Data

Feb. 12, 2016 (JP) .................................. 2016-024957

(51) Int. Cl.
*H01R 13/52* (2006.01)
*G06F 1/16* (2006.01)
*H01R 13/629* (2006.01)

(52) U.S. Cl.
CPC .......... *G06F 1/1654* (2013.01); *G06F 1/1616* (2013.01); *G06F 1/1626* (2013.01);
(Continued)

(58) Field of Classification Search
CPC ............................ H01R 13/52; H01R 13/5227
See application file for complete search history.

(56) References Cited

U.S. PATENT DOCUMENTS 3,478,298 A * 11/1969 Nelson ................. H01R 13/523
439/205
3,657,681 A * 4/1972 Falkner ................ H01R 13/523
439/205
(Continued)

FOREIGN PATENT DOCUMENTS

JP 03-090325 U 9/1991
JP 06-266472 A 9/1994
(Continued)

OTHER PUBLICATIONS

International Search Report for corresponding App. No. PCT/JP2017/002633, dated Feb. 28, 2017.

*Primary Examiner* — Tho D Ta
(74) *Attorney, Agent, or Firm* — Renner, Otto, Boisselle & Sklar, LLP

(57) ABSTRACT

An electronic device includes a first unit including a display, and a second unit including an input part, and the first unit and the second unit are formed to be detachable. The second unit includes a socket that is capable of accommodating a side part of the first unit. The socket includes a lock mechanism configured to detachably lock the first unit with the second unit, an operating member configured to operate the lock mechanism, and a dust discharge mechanism configured to discharge dust that has entered the socket out of the socket in conjunction with operation of the operating member.

3 Claims, 27 Drawing Sheets

(52) U.S. Cl.
CPC ........... *G06F 1/1632* (2013.01); *H01R 13/52* (2013.01); *H01R 13/629* (2013.01); *H01R 13/5227* (2013.01); *H01R 2201/06* (2013.01)

(56) References Cited

U.S. PATENT DOCUMENTS

| | | | | |
|---|---|---|---|---|
| 5,511,987 A | * | 4/1996 | Shinchi | H01R 13/5221 439/205 |
| 5,769,648 A | * | 6/1998 | Hayashi | H01R 13/5227 439/206 |
| 5,816,835 A | * | 10/1998 | Meszaros | H01R 13/5221 439/205 |
| 2014/0362509 A1 | | 12/2014 | Lin | |

FOREIGN PATENT DOCUMENTS

| | | |
|---|---|---|
| JP | 08-083136 A | 3/1996 |
| JP | 2014-099007 A | 5/2014 |
| JP | 2014-238840 A | 12/2014 |

\* cited by examiner

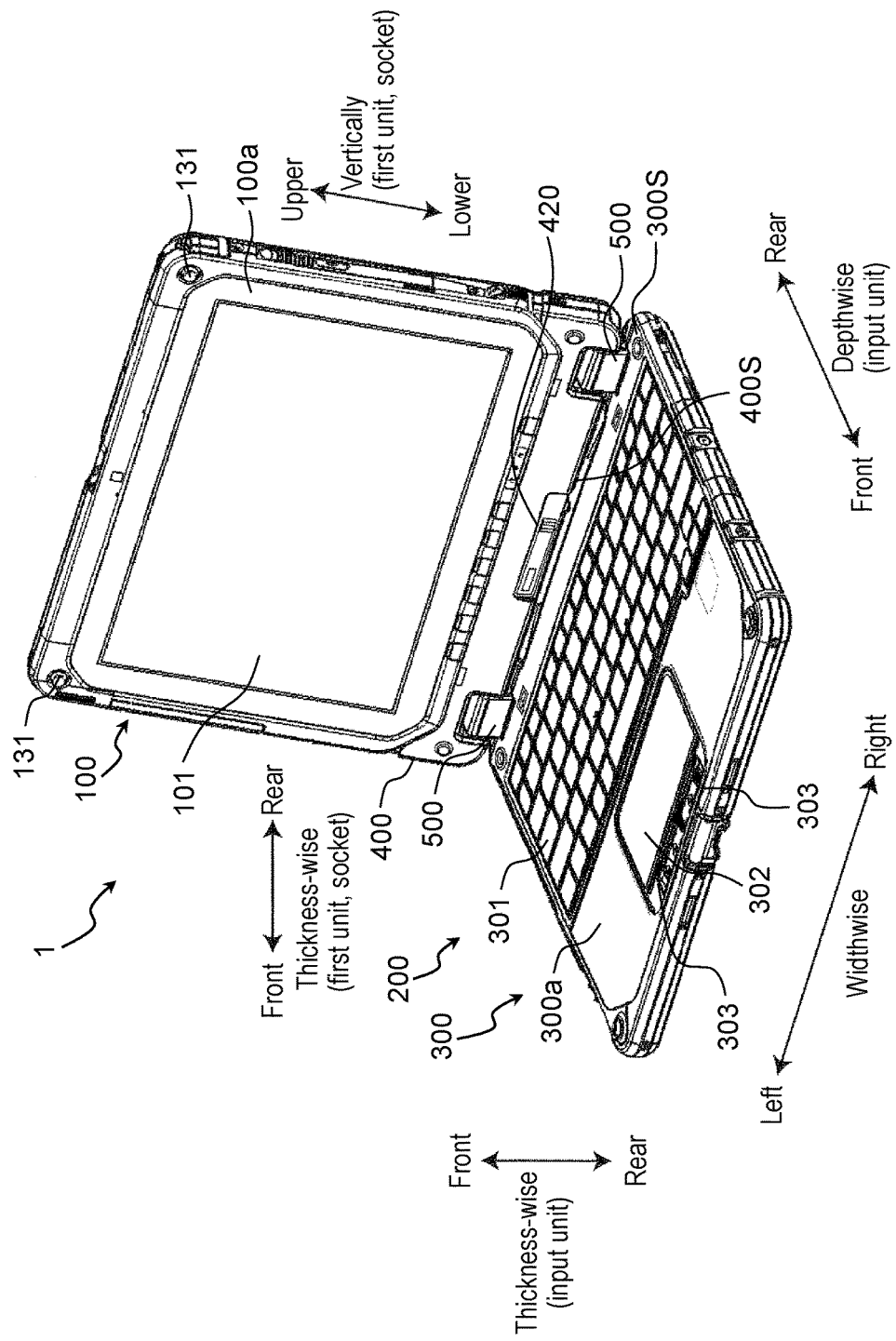

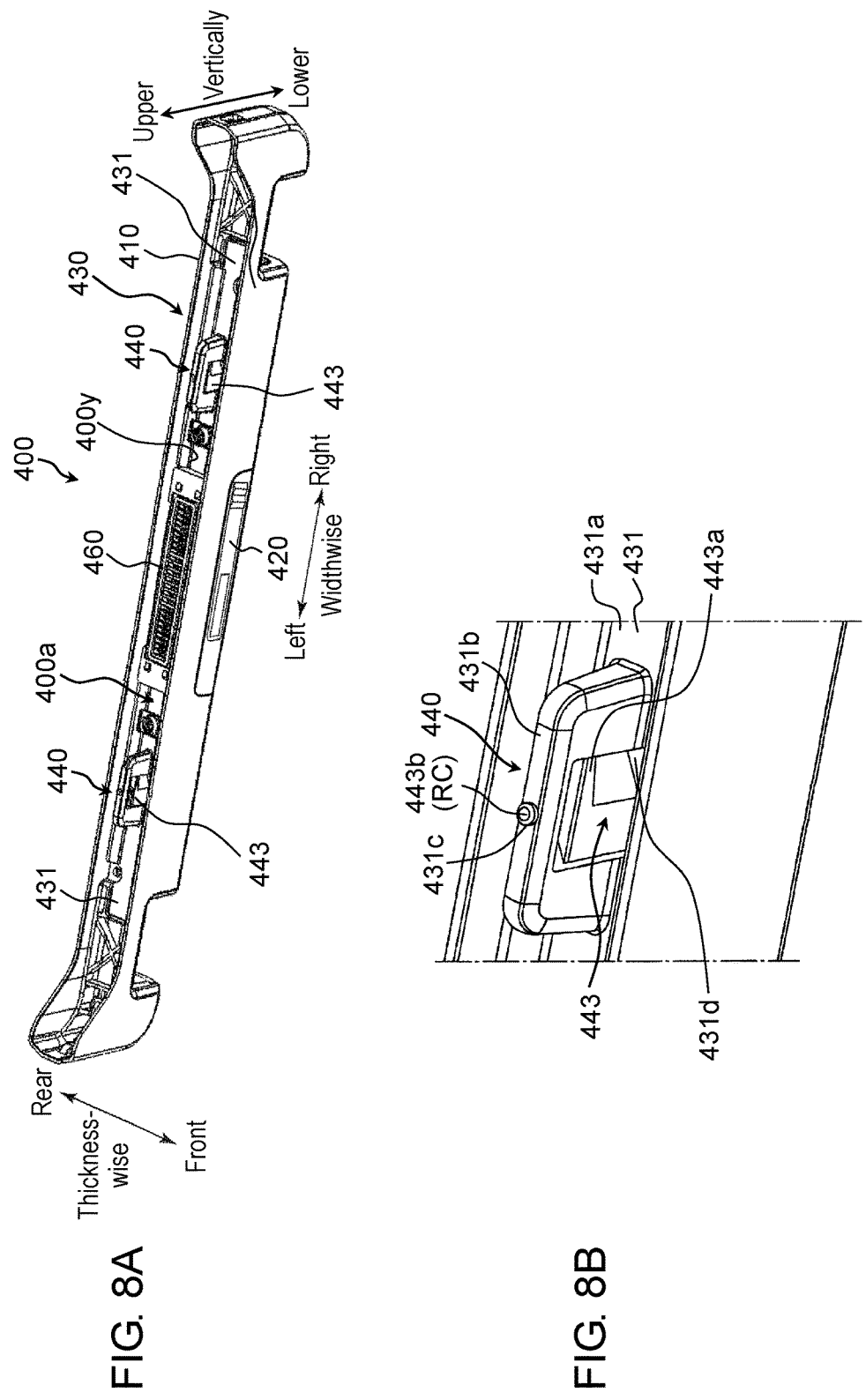

Front ← Thickness-wise → Rear

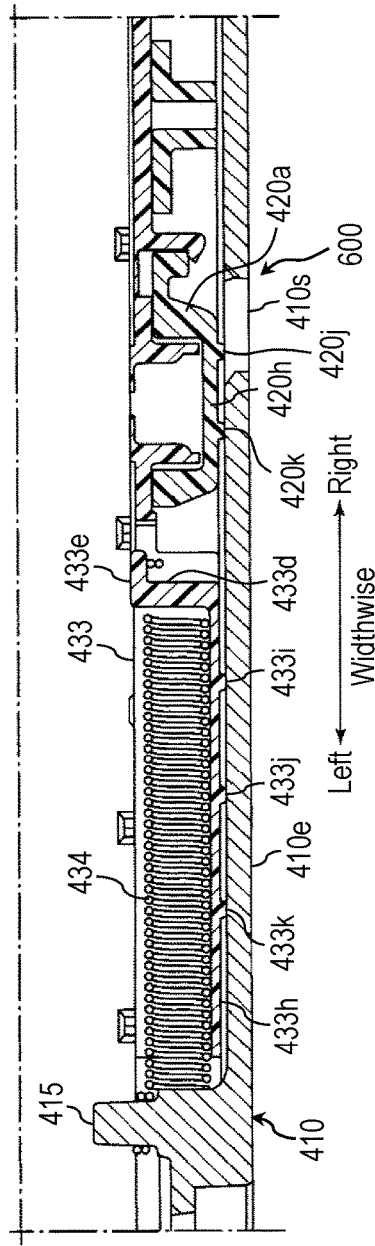
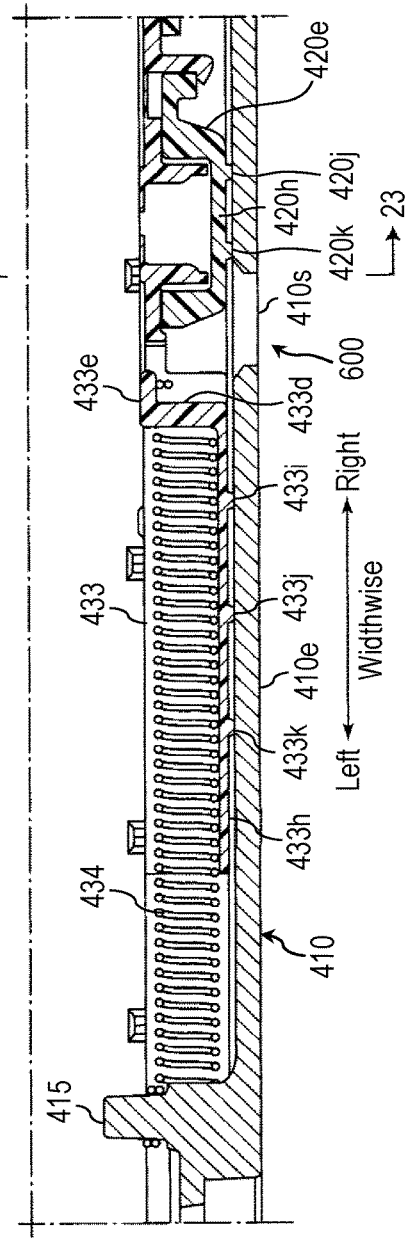
FIG. 20A
FIG. 20B

ELECTRONIC DEVICE HAVING DETACHABLE PARTS AND A DUST DISCHARGE MECHANISM

BACKGROUND

1. Technical Field

The present disclosure relates to an electronic device that includes a first unit including a display, and a second unit including an input part, the first unit and the second unit being formed to be detachable.

2. Description of the Related Art

Unexamined Japanese Patent Publication No. 2014-99007 discloses an electronic device that includes a tablet computer (first unit) and a station (second unit) that includes a keyboard, the tablet computer and the station being formed to be detachable.

SUMMARY

An electronic device of the present disclosure includes a first unit including a display, and a second unit including an input part, the first unit and the second unit being formed to be detachable.

The second unit includes a socket that is capable of accommodating a side part of the first unit.

The socket includes a lock mechanism configured to detachably lock the first unit with the second unit, an operating member configured to operate the lock mechanism, and a dust discharge mechanism configured to discharge dust that has entered the socket out of the socket in conjunction with operation of the operating member.

According to the present disclosure, the dust that enters the socket can be discharged out of the socket in conjunction with the operation of the operating member.

BRIEF DESCRIPTION OF DRAWINGS

FIG. 1 is a front perspective view of an electronic device according to an exemplary embodiment;

FIG. 8A is an external view of the socket of the second unit in the electronic device according to the present exemplary embodiment (with the engagement members each being in a second rotational position), and specifically a perspective view of the socket;

FIG. 8B is an external view of the socket of the second unit in the electronic device according to the present exemplary embodiment (with the engagement member being in the second rotational position), and specifically an enlarged perspective view of the engagement member;

FIG. 20A is an enlarged view of a portion indicated by arrow H of FIG. 19B;

FIG. 20B is an enlarged view of the portion indicated by arrow H of FIG. 19B;

DETAILED DESCRIPTION

Exemplary embodiments are hereinafter described in detail with reference to the accompanying drawings as appropriate. However, detailed descriptions that are more than necessary may be omitted. For example, there are cases where detailed description of well-known matters and repeated description of substantially the same structure are omitted for the purpose of preventing the following description from needlessly having redundancy, thereby facilitating understanding by those skilled in the art.

It should be noted that the inventor of the present disclosure provides the appended drawings and the following description in order to allow those skilled in the art to fully understand the present disclosure and thus does not intend to limit the subject matter as described in the appended claims.

First Exemplary Embodiment

A first exemplary embodiment will be described below with reference to the drawings.

[1. Structure]

[1-1. Outline of Electronic Device]

Figure 2A:
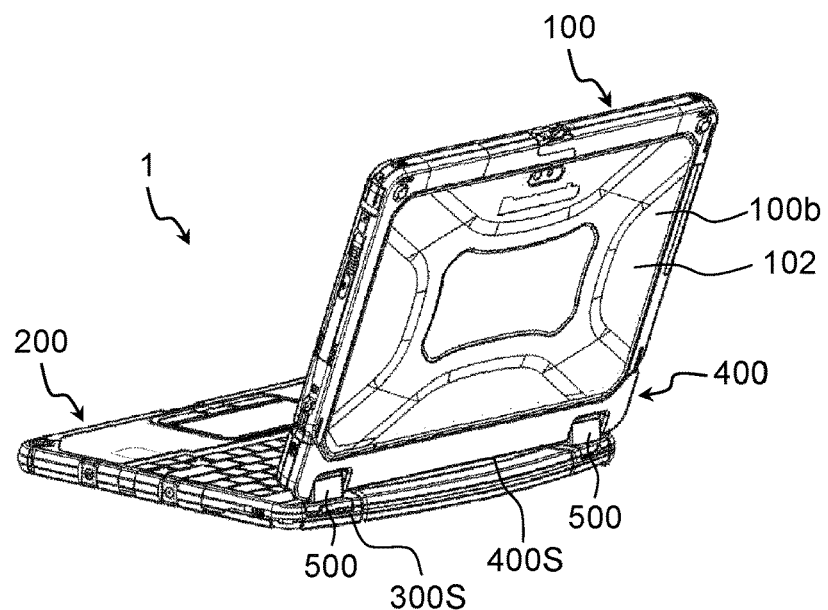
FIG. 2A is a rear perspective view of the electronic device according to the present exemplary embodiment.
Figure 2B:
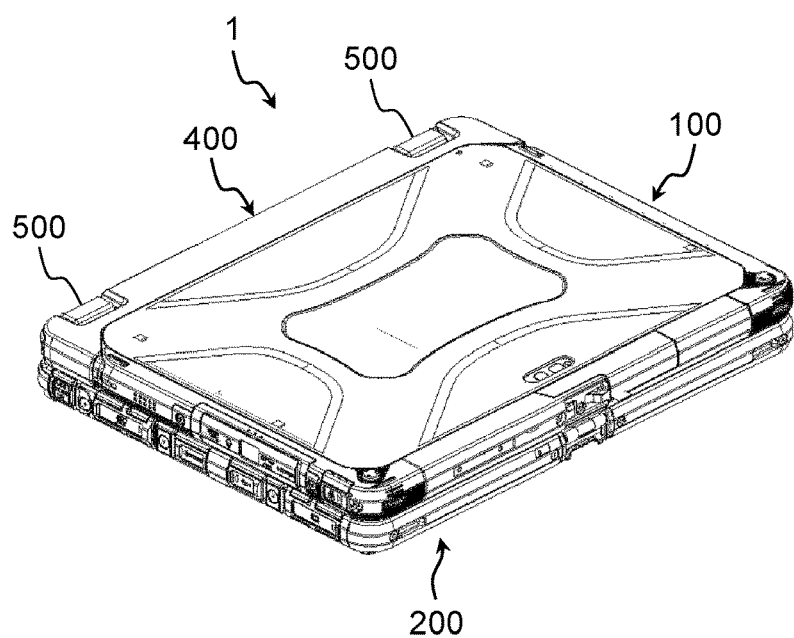
FIG. 2B is a perspective view of the electronic device according to the present exemplary embodiment with a first unit and a second unit closed.

FIG. 1 is a front perspective view of electronic device 1 according to the present exemplary embodiment. FIG. 1 illustrates an appearance of electronic device 1 that is opened. FIG. 2A is a rear perspective view of electronic device 1 according to the present exemplary embodiment. FIG. 2B is a perspective view of electronic device 1 according to the present exemplary embodiment with first unit 100 and second unit 200 closed. In FIG. 1 and the like, directions of devices, units, and the like are defined. Electronic device 1, first unit 100, second unit 200, input unit 300, and socket 400 have their respective widths along the same direction, and such a direction may hereinafter be simply referred to as "widthwise". In the present exemplary embodiment, rotation axis HC of hinges 500 is directionally parallel to the above widths. In the figures other than FIG. 1, directions of the units to be explained are defined. The above definitions are provided for convenience of explanation to facilitate understanding and do not specify, for example, absolute conditions for disposition of the constituent elements and directions in which the constituent elements are used.

Figure 3A:
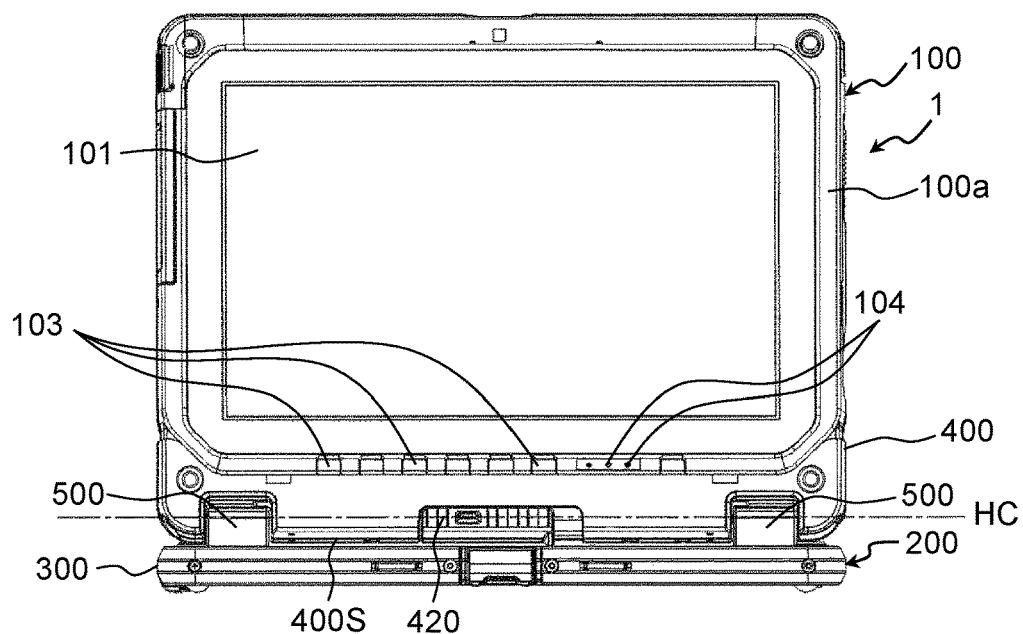
FIG. 3A is a front view of the electronic device according to the present exemplary embodiment, illustrating the first unit (tablet computer) fitted to the second unit.
Figure 3B:
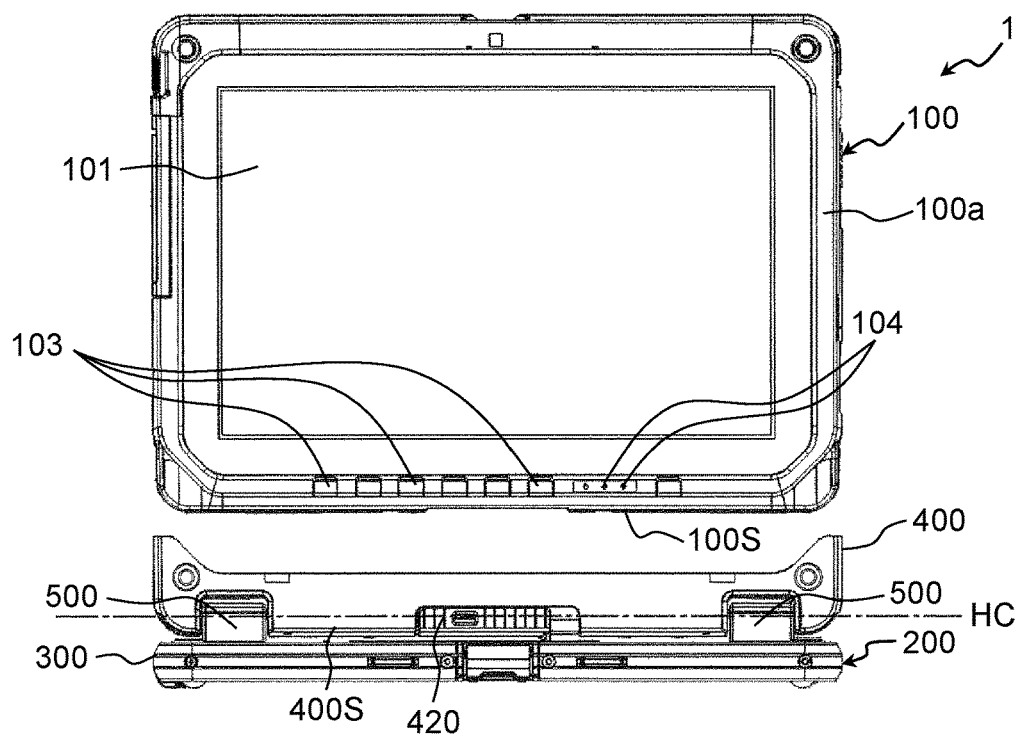
FIG. 3B is a front view of the electronic device according to the present exemplary embodiment, illustrating the first unit (tablet computer) removed from the second unit.

As shown in FIG. 1, electronic device 1 includes first unit (tablet computer) 100 and second unit 200 (that includes keyboard 301 and the like). First unit 100 and second unit 200 are detachable, so that electronic device 1 is configured as a so-called detachable computer. FIGS. 3A and 3B are front views of electronic device 1 according to the present exemplary embodiment. Specifically, FIG. 3A illustrates first unit 100 mounted to second unit 200, while FIG. 3B illustrates first unit 100 removed from second unit 200.

As illustrated in FIGS. 1, 2A, 2B, 3A, and 3B, first unit 100 is a tablet computer. First unit 100 includes display 101 at first primary surface 100a (positioned on a thickness-wise front side of first unit 100). Display 101 is, for example, a liquid crystal display panel. Display 101 is also a touch panel that is capable of accepting touch operation by a user. First unit 100 includes, for example, a central processing unit (CPU), a volatile memory such as random access memory (RAM), nonvolatile memories such as a read only memory (ROM) and a solid state drive (SSD), and a battery. Second primary surface 100b (positioned on a thickness-wise rear side of first unit 100) has detachable cover 102. In the nonvolatile memories (such as the ROM and the SSD), an operating system (OS), various application programs, various data, and the like are stored. The central processing unit (CPU) reads the OS, the application programs, and the various data and performs arithmetic processing to achieve various functions.

Second unit 200 includes an input part that allows the user to perform input processing, and allows detachment of first unit 100. Second unit 200 includes input unit 300, socket 400, and hinges 500.

A casing of input unit 300 is made of, for example, resin or metal such as a magnesium alloy. Input unit 300 is provided with, at its primary surface 300a (positioned on a thickness-wise front side of input unit 300), the input part that includes keyboard 301, touch pad 302, and a plurality of operation buttons 303.

Socket 400 is capable of accommodating side part 100S that is positioned on a vertically lower side of first unit 100 (and is hereinafter referred to as "lower side part 100S" as appropriate).

Hinges 500 connect side part 300S of input unit 300 that is positioned on a depthwise rear side of input unit 300 (and is hereinafter referred to as "rear side part 300S" as appropriate) and side part 400S of socket 400 that is positioned on a vertically lower side of socket 400 (and is hereinafter referred to as "lower side part 400S" as appropriate) so that input unit 300 and socket 400 are rotatable relative to each other. Hinges 500 have rotation axis HC that is parallel to the width of electronic device 1. Hinges 500 can, for example, hold first unit 100 and second unit 200 in an opened state with first unit 100 and second unit 200 forming an angle of, for example, about 100 degrees as shown in FIGS. 1, 2A. Hinges 500 also enables closing of first unit 100 with respect to second unit 200 (so that first primary surface 100a of first unit 100 and primary surface 300a of input unit 300 of second unit 200 are closely opposed to each other in substantially parallel relationship).

Socket 400 is provided with connector 460 (see FIG. 7A) that is connected to connector 120 (see FIG. 4) of first unit 100 with lower side part 100S of first unit 100 accommodated in socket 400. Via connector 120 and connector 460, various exchanges of signals and electric power can be carried out between first unit 100 and second unit 200. The signals that can be output to first unit 100 from second unit 200 include, for example, signals from the input part of input unit 300 such as keyboard 301, touch pad 302, and the plurality of operation buttons 303. Upon receipt of these signals, first unit 100 is capable of control based on these received signals. Thus, with first unit 100 mounted to second unit 200, electronic device 1 can be used as a notebook computer. Alternatively, first unit 100 itself can be used as a tablet computer.

[1-2. Structure of Lock Mechanism]

Electronic device 1 of the present exemplary embodiment includes a lock mechanism that prevents detachment of first unit 100 from second unit 200 while first unit 100 is mounted (connected) to second unit 200. In other words, electronic device 1 includes the lock mechanism that is capable of locking first unit 100 and second unit 200 with first unit 100 and second unit 200 connected to each other. The lock mechanism will be described below in detail.

[1-2-1. Structure of First Unit-Side Component of Lock Mechanism]

Figure 4:
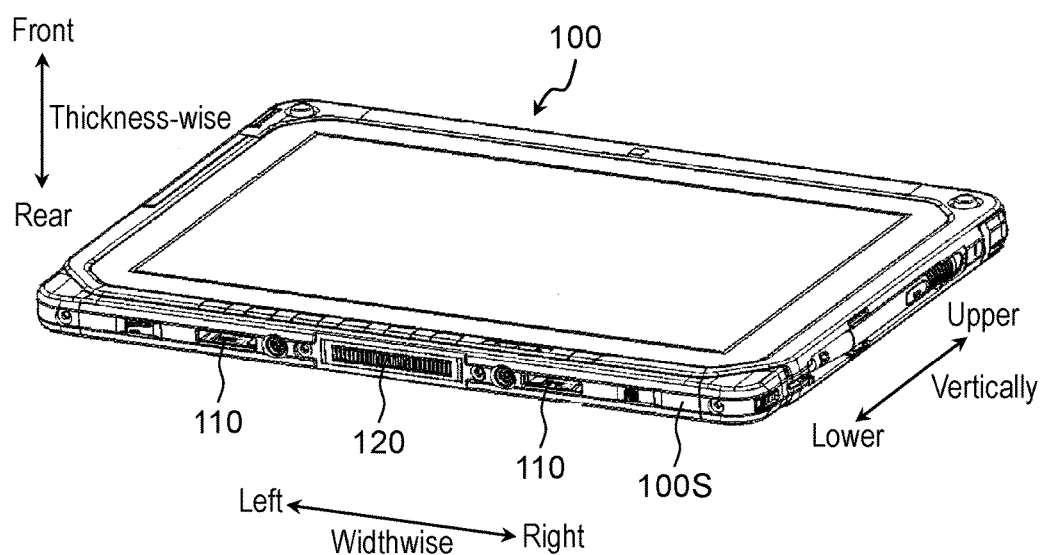
FIG. 4 is a perspective view of the first unit (tablet computer) of the electronic device according to the present exemplary embodiment.

FIG. 4 is a perspective view of first unit (tablet computer) 100 of electronic device 1 according to the present exemplary embodiment. Lower side part 100S of first unit 100 is provided with engaging target parts 110 as first unit 100-side components of the lock mechanism. Engaging target parts 110 can respectively engage respective engagement members 443 (see FIGS. 7A and 7B) of engagement parts 440 that are second unit 200-side components of the lock mechanism. Two engaging target parts 110 are provided in lower side part 100S spaced apart from each other along the width of first unit 100.

Figure 5:
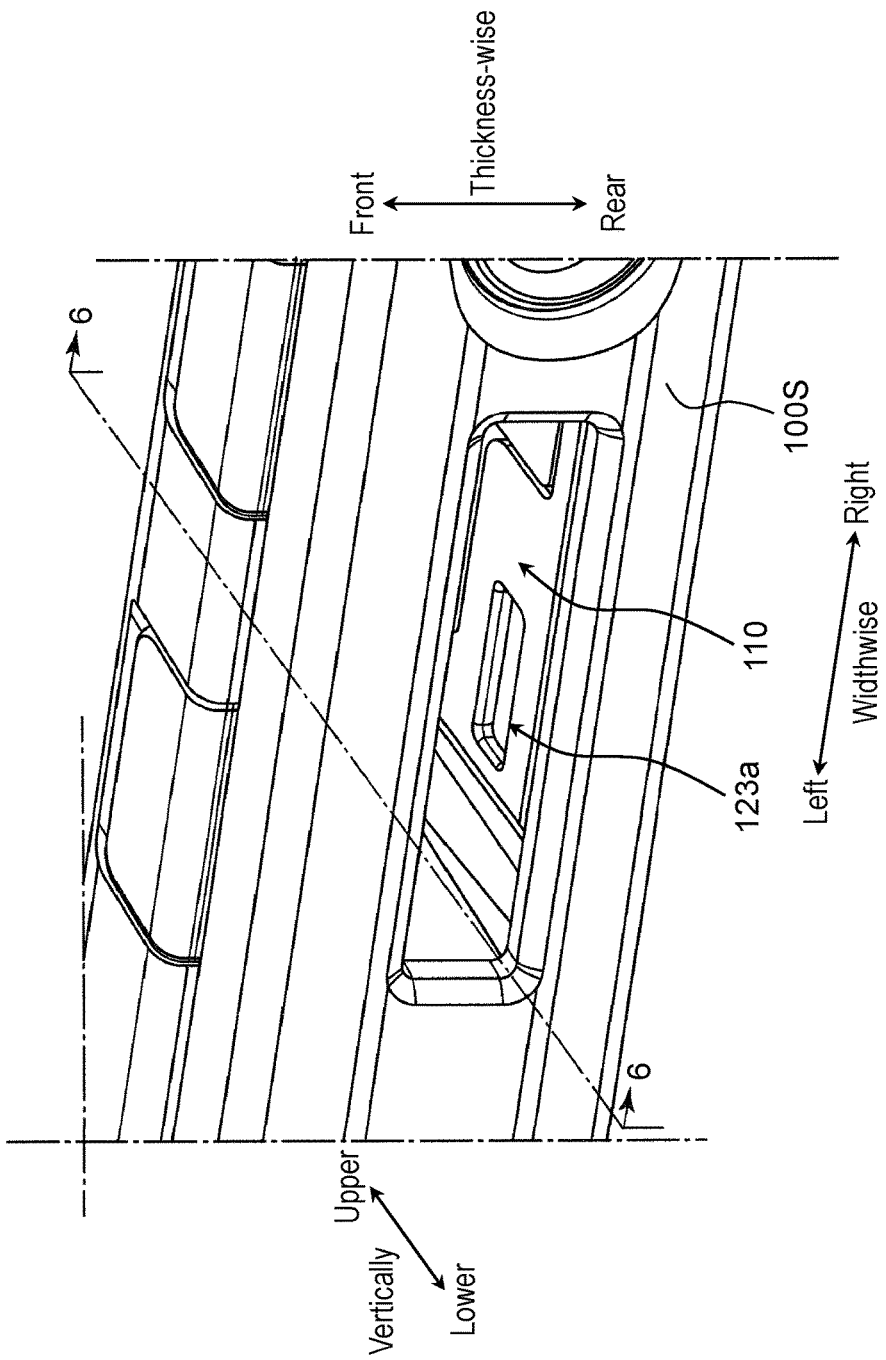
FIG. 5 is an enlarged perspective view of an engaging target part of the first unit in the electronic device according to the present exemplary embodiment.
Figure 6:
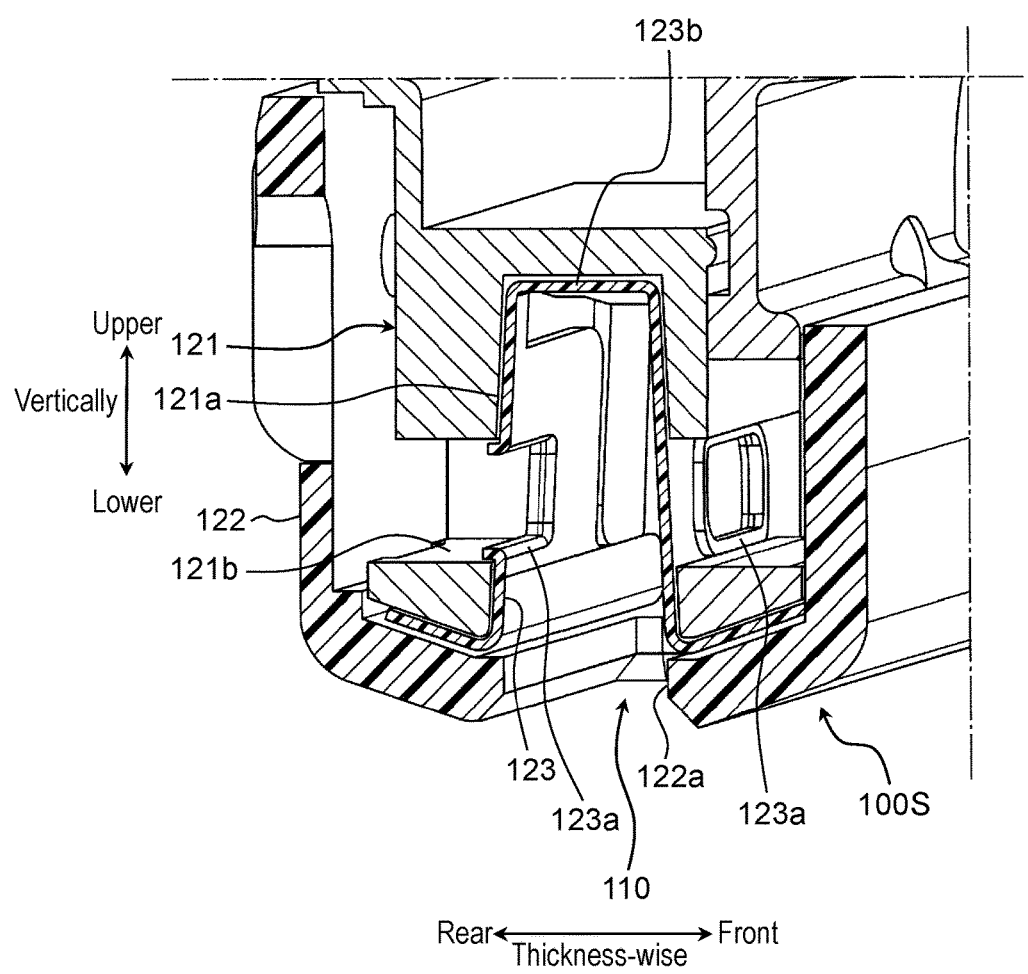
FIG. 6 is a cross-sectional view taken along line 6-6 of FIG. 5.

FIG. 5 is an enlarged perspective view of engaging target part 110 of first unit 100 in electronic device 1 according to the present exemplary embodiment. FIG. 6 is a cross-sectional view taken along line 6-6 of FIG. 5. As shown in these figures, engaging target parts 110 are formed as recesses that can respectively engage engagement members 443, which are described later. First unit 100 includes frame 121 that is made of metal and side cover 122 that is made of resin. Frame 121 is a member that forms a framework and a part of an exterior of first unit 100. Side cover 122 is a frame-shaped member that covers an exterior of lower side part 100S of first unit 100. Recesses 121a are formed in frame 121, and openings 122a are formed in side cover 122. Recesses 121a of frame 121 are mounted with, at their respective surfaces, protective members 123 that are made of metal. Each of protective members 123 is provided with engagement holes 123a that can respectively engage a pair of engagement projections 443a (to be described later) (see FIG. 7B) of each of engagement members 443. Frame 121 is further provided with, at each of recesses 121a, engagement recesses 121b that can respectively engage engagement projections 443a of each of engagement members 443. Note that protective members 123 are preferably made of stainless steel material instead of magnesium material for wear prevention.

[1-2-2. Structure of Each Second Unit-Side Component of Lock Mechanism and Structure of Socket]

[1-2-2-1. Structure of Socket]

Figure 7A:
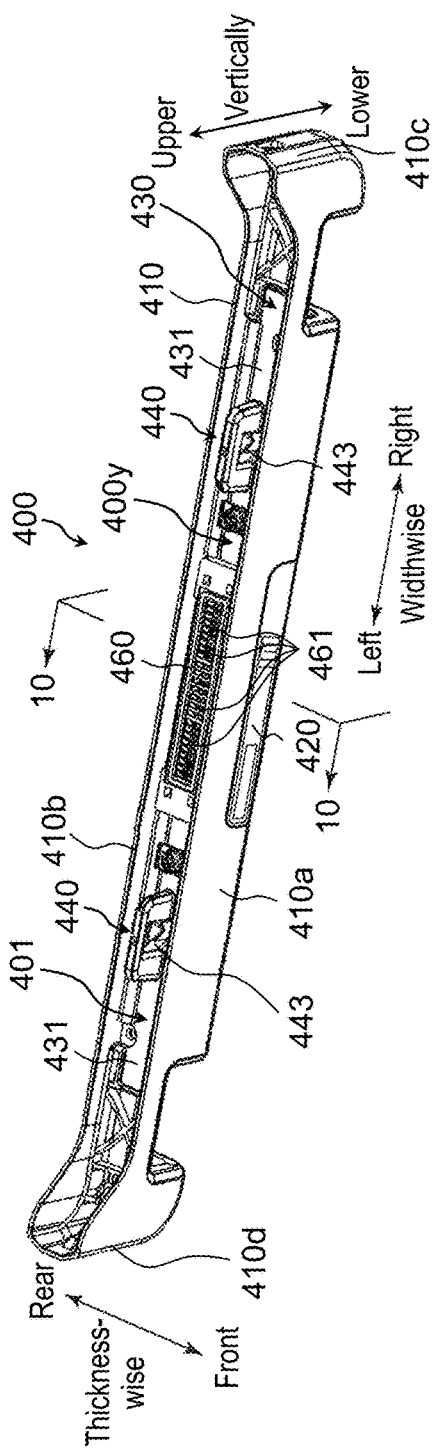
FIG. 7A is an external view of a socket of the second unit in the electronic device according to the present exemplary embodiment (with engagement members each being in a first rotational position), and specifically a perspective view of the socket.
Figure 7B:
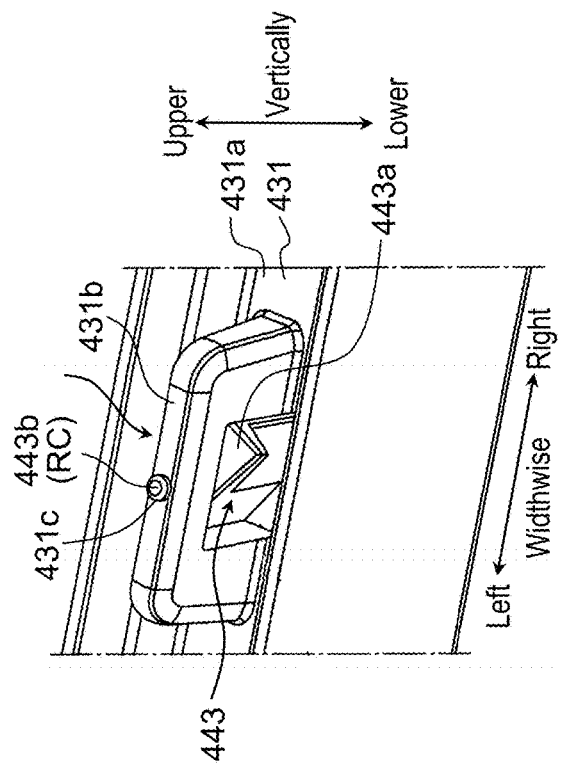
FIG. 7B is an external view of the socket of the second unit in the electronic device according to the present exemplary embodiment (with the engagement member being in the first rotational position), and specifically an enlarged perspective view of the engagement member.

Second unit 200-side components of the lock mechanism are accommodated in socket 400. FIGS. 7A and 7B are external views of socket 400 of electronic device 1 according to the present exemplary embodiment (with engagement members 443 each being in a first rotational position). Specifically, FIG. 7A is a perspective view of socket 400, while FIG. 7B is an enlarged perspective view of engagement member 443. FIGS. 8A and 8B are external views of socket 400 of electronic device 1 (with engagement members 443 each being in a second rotational position) according to the present exemplary embodiment. Specifically, FIG. 8A is a perspective view of socket 400, while FIG. 8B is an enlarged perspective view of engagement member 443.

Figure 11:
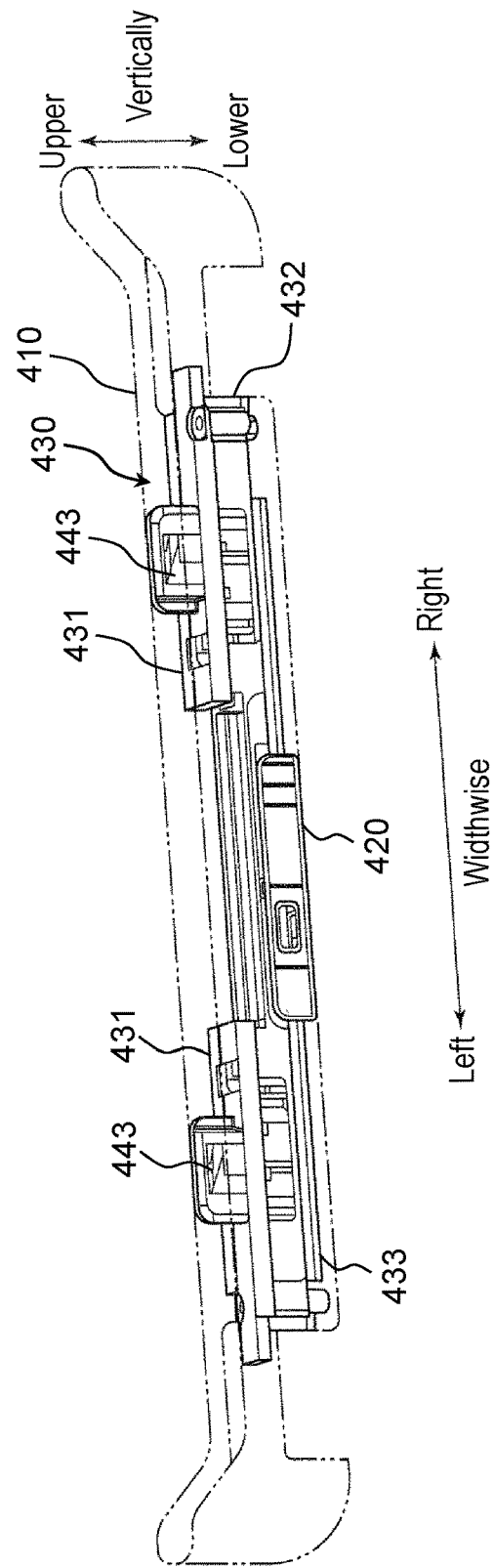
FIG. 11 is a perspective view of socket-side components among components of a lock mechanism in the electronic device according to the present exemplary embodiment.

Socket 400 includes socket body 410, operating member 420, engagement parts 440 that have respective engagement members 443, and drive mechanism 430 (see FIG. 11).

Socket 400 has a boat shape extending widthwise of electronic device 1 and includes recess 400y into which lower side part 100S of first unit 100 can fit.

Engagement parts 440 are formed to be engageable in respective engaging target parts 110 formed in lower side part 100S of first unit 100, as described later. As will be detailed later, engagement members 443 are each formed to be rotatable about rotation axis RC (an axis of rotation shaft 443b) that is parallel to vertical directions of socket 400. Two engagement members 443 are each provided at an upper surface of base 431a of support member 431 and are spaced apart along the width of socket 400. These two engagement members 443 are each disposed to have a positional relationship engageable with engaging target part 110 of first unit 100 when lower side part 100S of first unit 100 is fitted into socket 400. Engagement members 443 are each disposed to project upward beyond the upper surface of base 431a of support member 431 (i.e., beyond a predetermined surface of second unit 200).

When operating member 420 is at a first position (predetermined widthwise left position) as shown in FIG. 7A, engagement members 443 each rotate to the first rotational position (where engagement projections 443a of engagement member 443 respectively project in a thickness-wise frontward direction and a thickness-wise rearward direction beyond engagement member support 431b of support member 431), thus engaging with engaging target part 110. When operating member 420 is at a second position (predetermined widthwise right position) as shown in FIG. 8A, engagement members 443 each rotate to the second rotational position (where engagement projections 443a of engagement member 443 do not project thickness-wise beyond engagement member support 431b of support member 431), thus being disengaged from engaging target part 110.

[1-2-2-2. Socket Body]

Figure 9A:
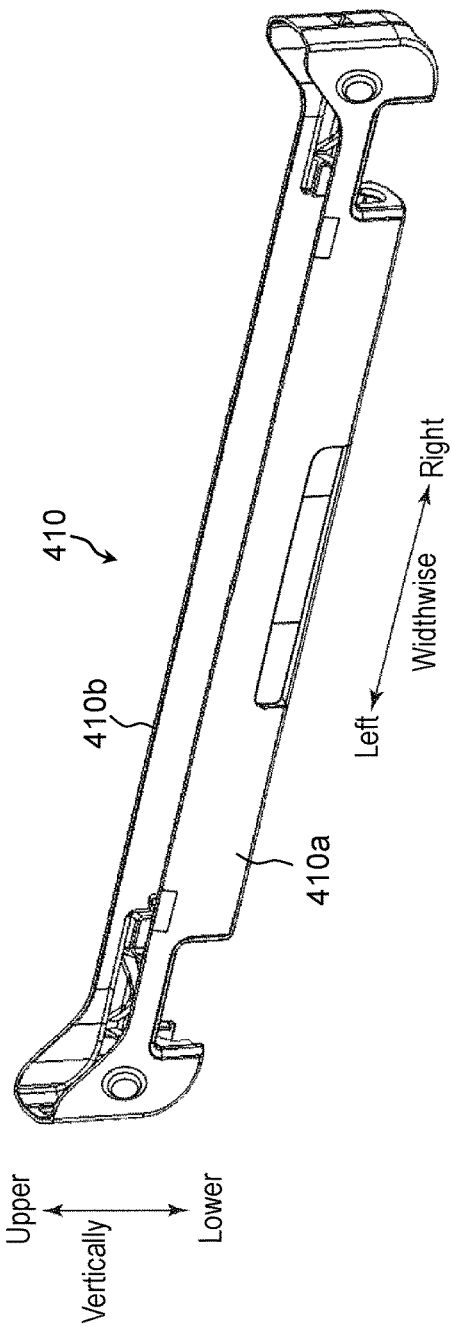
FIG. 9A is an external view of a socket body of the electronic device according to the present exemplary embodiment, and specifically a perspective view of the socket body.
Figure 9B:
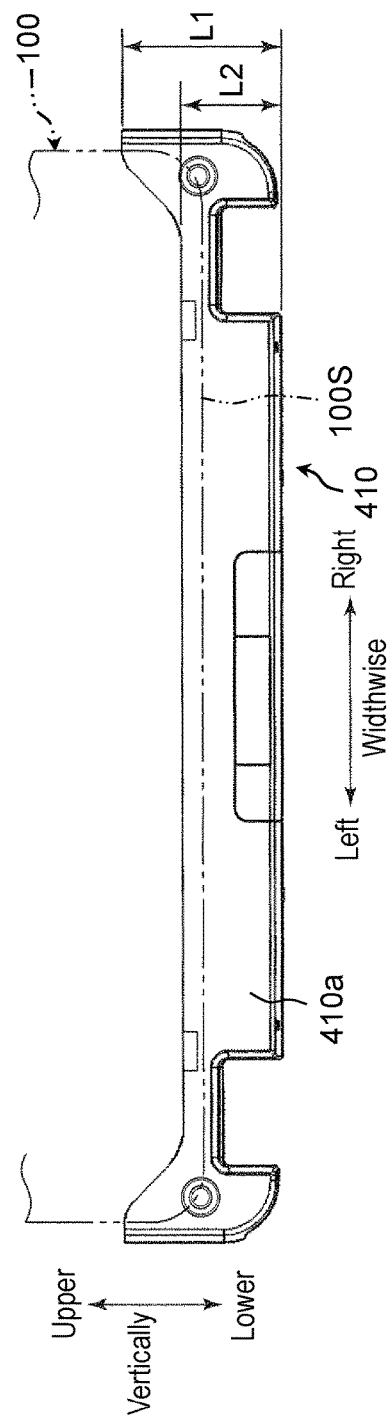
FIG. 9B is an external view of the socket body of the electronic device according to the present exemplary embodiment, and specifically a side view of the socket body.

FIGS. 9A and 9B are external views of socket body 410 of electronic device 1 according to the present exemplary embodiment. Specifically, FIG. 9A is a perspective view of socket body 410, while FIG. 9B is a side view of socket body 410.

Socket body 410 has a boat shape and accommodates drive mechanism 430 (see FIG. 11). Socket body 410 is made of resin. Note that socket body 410 may be made of metal such as a magnesium alloy.

Figure 10:
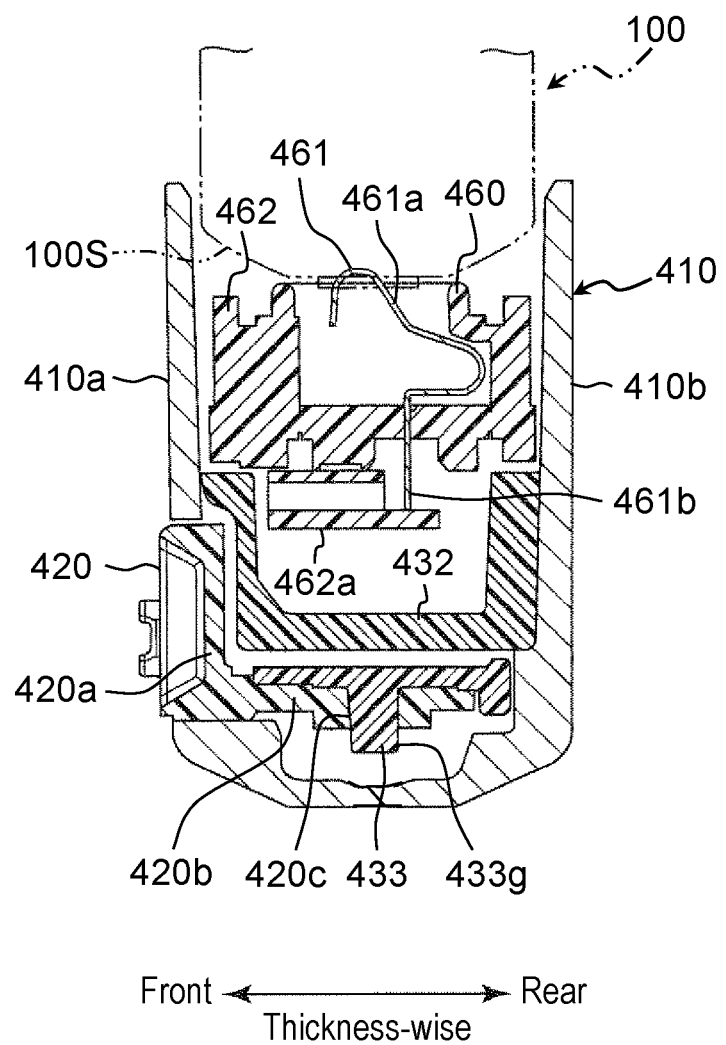
FIG. 10 is a cross-sectional view taken along line 10-10 of FIG. 7A (with some members omitted)

FIG. 10 is a cross-sectional view taken along line 10-10 of FIG. 7A (with some members omitted). A cross-section shape shown in FIG. 10 is perpendicular to the width (length or an extending direction) of socket 400 in a position along line 10-10. Although in the present exemplary embodiment, socket 400, lower side part 100S, and rear side part 300S have their respective widths, lengths, and extending directions along the same direction, any one of the directional terms is appropriately used according to description of each of the members to facilitate understanding. Socket body 410 has first outer wall 410a and second outer wall 410b. With lower side part 100S of first unit 100 accommodated in socket 400, first outer wall 410a extends parallel to the extending direction of lower side part 100S of first unit 100 (see FIG. 9A) and is parallel to first primary surface 100a of first unit 100. First primary surface 100a is supported by first outer wall 410a at lower side part 100S. With lower side part 100S accommodated in socket 400, second outer wall 410b extends parallel to the extending direction of lower side part 100S of first unit 100 (see FIG. 9B) and is parallel to second primary surface 100b (positioned on the rear side) of first unit 100. Second primary surface 100b is supported by second outer wall 410b at lower side part 100S. Socket body 410 has a cross section of substantially U-shape that is perpendicular to the extending direction of socket 400.

According to the above structure, first unit 100 has its first primary surface 100a and its second primary surface 100b supported at lower side part 100S in sandwich style between first outer wall 410a and second outer wall 410b of socket 400.

As shown in FIGS. 3A, 3B, first primary surface 100a of first unit 100 has, along the width of socket 400, operation switches 103 and indicators 104 that are disposed in a central part (other than ends in the extending direction) of lower side part 100S positioned below display 101. For this reason, first outer wall 410a needs to have such a vertical length (height) in this part as not to interfere with operation switches 103 and indicators 104 and thus cannot secure a sufficient height.

Accordingly, as shown in FIG. 9B in the present exemplary embodiment, first outer wall 410a and second outer wall 410b of socket body 410 have lengths L1 along the vertical directions (perpendicular to the extending direction) of socket 400 at widthwise ends (in the extending direction) of socket 400, and vertical lengths L2 at their respective parts other than the widthwise ends (in the extending direction) of socket 400, and lengths L1 are greater than lengths L2.

In this way, first outer wall 410a and second outer wall 410b can support first unit 100 up to higher positions at the widthwise ends of socket 400 even in cases where first primary surface 100a of first unit 100 has at least one of operation switch (second operating part) 103 and indicator 104 disposed in the widthwise central part of lower side part 100S. Consequently, support of first unit 100 accommodated in socket 400 of second unit 200 can be stabilized.

As shown in FIG. 7A, socket body 410 includes third outer wall 410c that connects a widthwise right end (in an extending direction) of first outer wall 410a and a widthwise right end of second outer wall 410b, and fourth outer wall 410d that connects a widthwise left end of first outer wall 410a and a widthwise left end of second outer wall 410b.

In this way, strength of socket 400 (socket body 410) improves. For example, first outer wall 410a and second outer wall 410b can be inhibited from falling in directions away from each other. Therefore, support of first unit 100 mounted in socket 400 of second unit 200 can be further stabilized.

[1-2-2-3. Operating Member]

Operating member 420 is a member that accepts unlock operation by the user. Operating member 420 is made of resin. Note that operating member 420 may be made of metal such as a magnesium alloy. Operating member 420 is supported by socket 400 to be linearly movable widthwise of socket 400 with respect to socket body 410 between the first position and the second position.

As shown in above-mentioned FIG. 10, operating member 420 includes operating part 420a that has a surface parallel to first outer wall 410a of socket body 410, and connecting part 420b that is connected with coupling member 433. Operating member 420 has a cross section of substantially L-shape that is perpendicular to the width (extending direction) of socket 400. Accordingly, the user can operate operating part 420a when, for example, operating electronic device 1 with first unit 100 being open with respect to second unit 200 as shown in FIG. 1.

[1-2-2-4. Engagement Members and Drive Mechanism]

FIG. 11 is a perspective view of socket 400-side components among the components of the lock mechanism in electronic device 1 according to the present exemplary embodiment.

Among the components of the lock mechanism, the socket 400-side components include above-mentioned operating member 420, engagement members 443, and drive mechanism 430.

[1-2-2-4-1. Drive Mechanism]

When operating member 420 is moved to the first position shown in FIG. 7A, drive mechanism 430 causes engagement members 443 to rotate to the respective first rotational positions. When operating member 420 is moved to the second position shown in FIG. 8A, drive mechanism 430 causes engagement members 443 to rotate to the respective second rotational positions. In other words, drive mechanism 430 translates the linear movement of operating member 420 between the first position and the second position into the rotation of each of engagement members 443 between the first rotational position and the second rotational position.

Figure 18A:
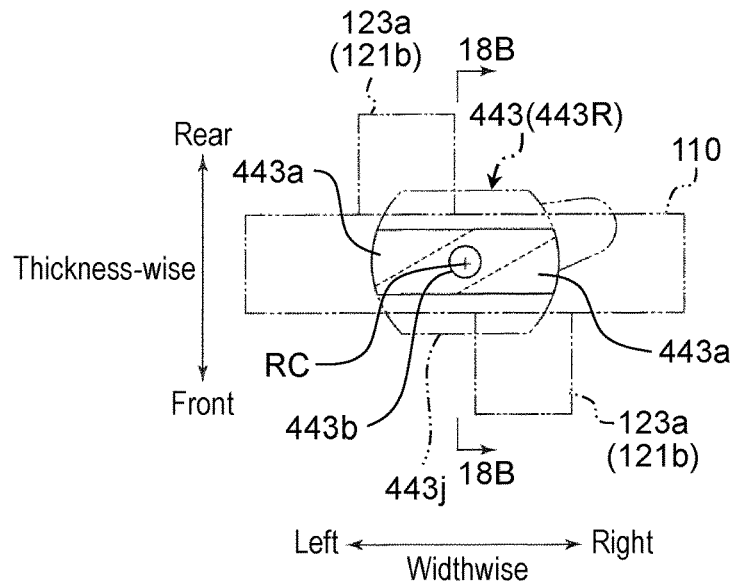
FIG. 18A is a view illustrating disengagement achieved by the lock mechanism of the electronic device according to the present exemplary embodiment, and specifically a plan view illustrating the disengagement.
Figure 18B:
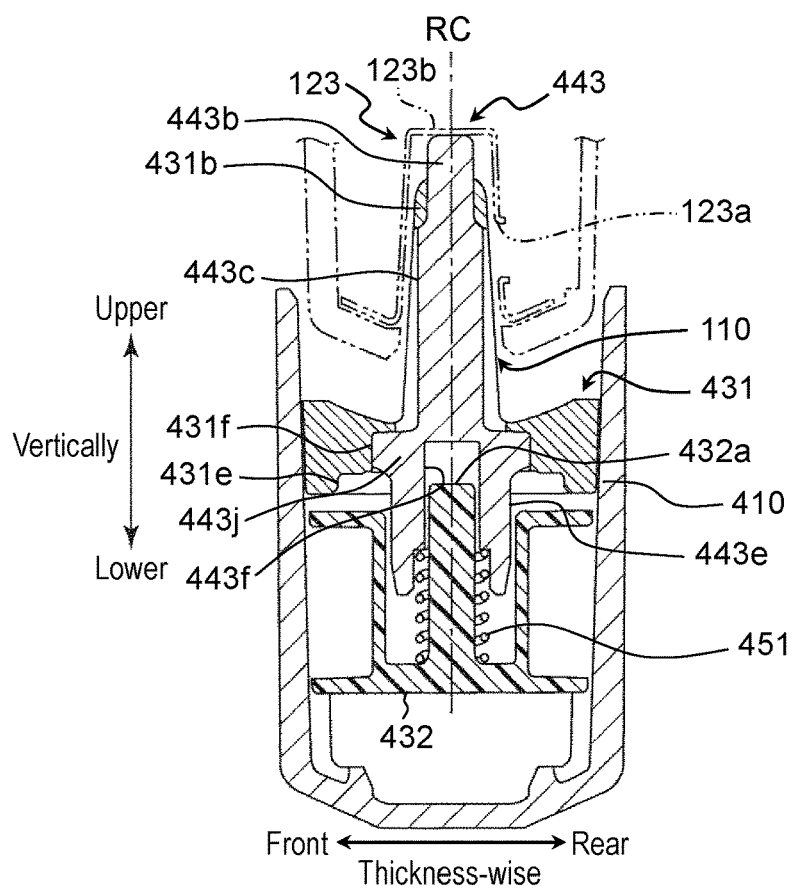
FIG. 18B is a cross-sectional view taken along line 18B-18B of FIG. 18A (and is based on the cross-sectional view of FIG. 14B, having the engaging target part added)

Drive mechanism 430 includes support members 431, base member 432, coupling member 433, first spring 434 (see FIGS. 19A and 19B), and second spring 451 (see FIG. 18B).

Figure 12A:
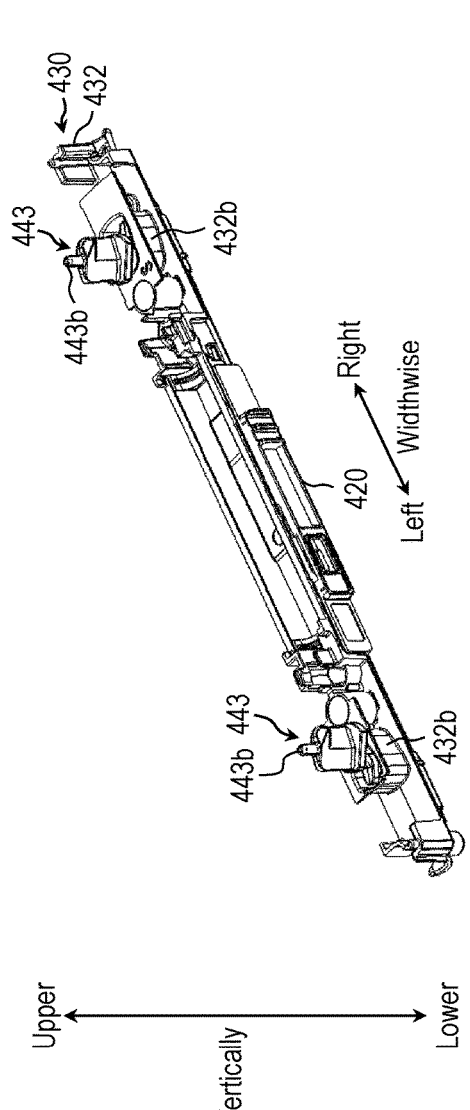
FIG. 12A is an external view of the socket-side components among the components of the lock mechanism in the electronic device according to the present exemplary embodiment (with the engagement members each being in the first rotational position and with some members omitted), and specifically a perspective view of the socket-side components.
Figure 12B:
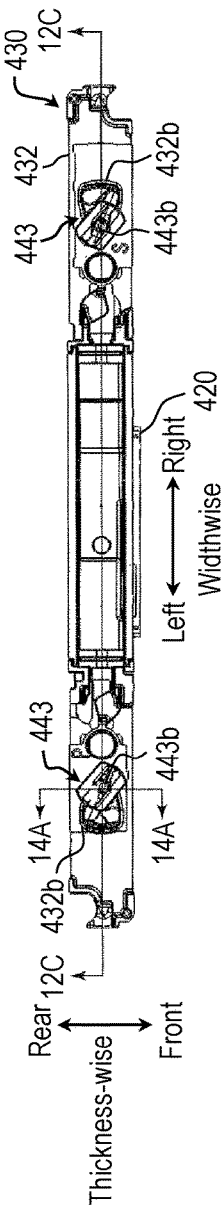
FIG. 12B is an external view of the socket-side components among the components of the lock mechanism in the electronic device according to the present exemplary embodiment (with the engagement members each being in the first rotational position and with some members omitted), and specifically a plan view of the socket-side components.
Figure 12C:
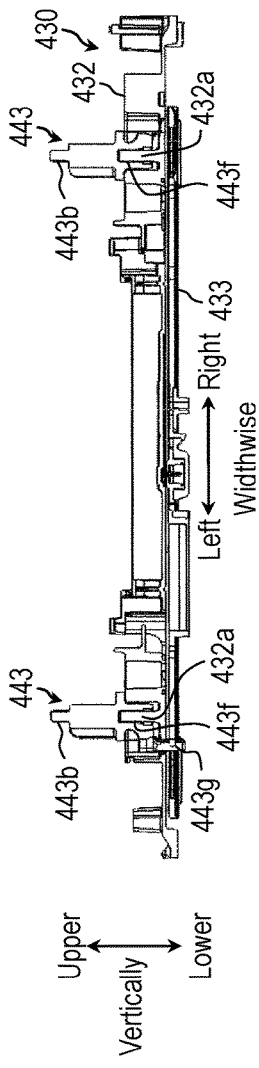
FIG. 12C is a cross-sectional view taken along line 12C-12C of FIG. 12B.
Figure 12D:
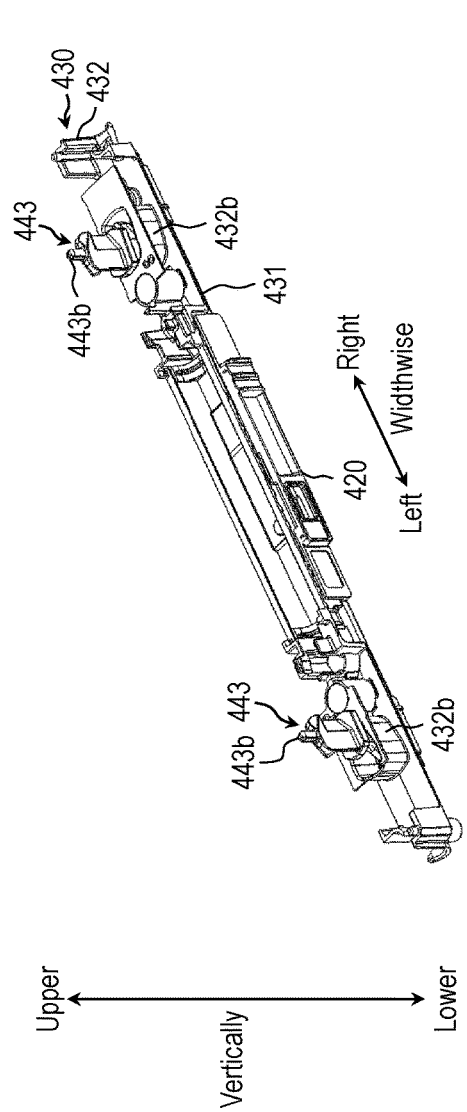
FIG. 12D is an external view of the socket-side components among the components of the lock mechanism in the electronic device according to the present exemplary embodiment (with the engagement members each being in the second rotational position and with some members omitted), and specifically a perspective view of the socket-side components.
Figure 12E:
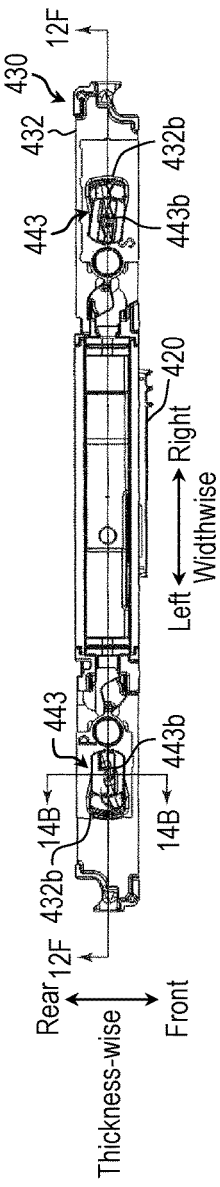
FIG. 12E is an external view of the socket-side components among the components of the lock mechanism in the electronic device according to the present exemplary embodiment (with the engagement members each being in the second rotational position and with some members omitted), and specifically a plan view of the socket-side components.
Figure 12F:
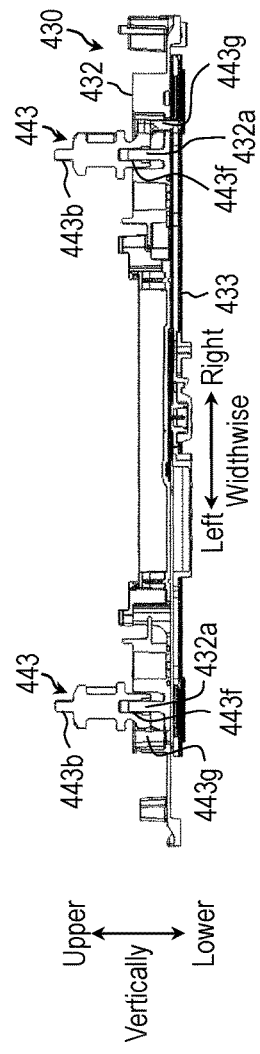
FIG. 12F is a cross-sectional view taken along line 12F-12F of FIG. 12E.

FIGS. 12A, 12B and 12C are external views of the socket 400-side components among the components of the lock mechanism in electronic device 1 (with engagement members 443 being in the respective first rotational positions and with some members omitted) according to the present exemplary embodiment. Specifically, FIG. 12A is a perspective view, FIG. 12B is a plan view, and FIG. 12C is a cross-sectional view taken along line 12C-12C of FIG. 12B. FIGS. 12D, 12E and 12F are external views of the socket-side components among the components of the lock mechanism in electronic device 1 (with engagement members 443 being in the respective second rotational positions and with some members omitted) according to the present exemplary embodiment. Specifically, FIG. 12D is a perspective view, FIG. 12E is a plan view, and FIG. 12F is a cross-sectional view taken along line 12F-12F of FIG. 12E.

Coupling member 433 is a plate-shaped member that extends widthwise of socket 400 and is fixed to operating member 420. Coupling member 433 is fixed to operating member 420 as a result of, for example, downwardly projecting projection 433g fitting in connection hole 420c of connecting part 420b of operating member 420 as shown in FIG. 10. Coupling member 433 is supported by socket body 410 to be movable along moving directions of operating member 420 (along the width of socket 400). Coupling member 433 is made of, for example, resin. Note that coupling member 433 may be made of metal as long as slidability equivalent to slidability of the resin is ensured.

Figure 15:
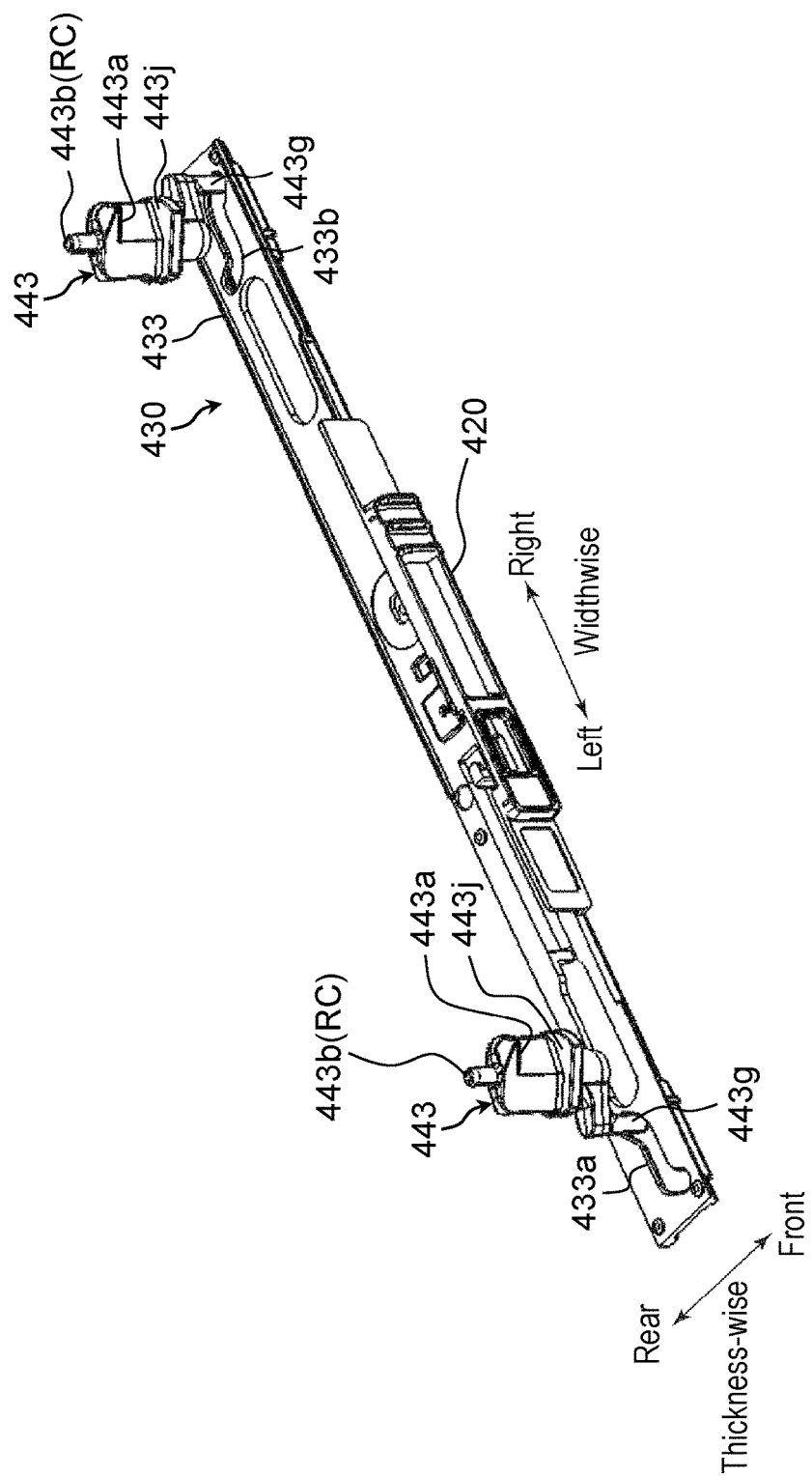
FIG. 15 is an external view of a coupling member, an operating member, and the engagement members that are the components of the lock mechanism of the electronic device according to the present exemplary embodiment, and specifically a perspective view illustrating the operating member in a first position and the engagement members in the respective first rotational positions.
Figure 17:
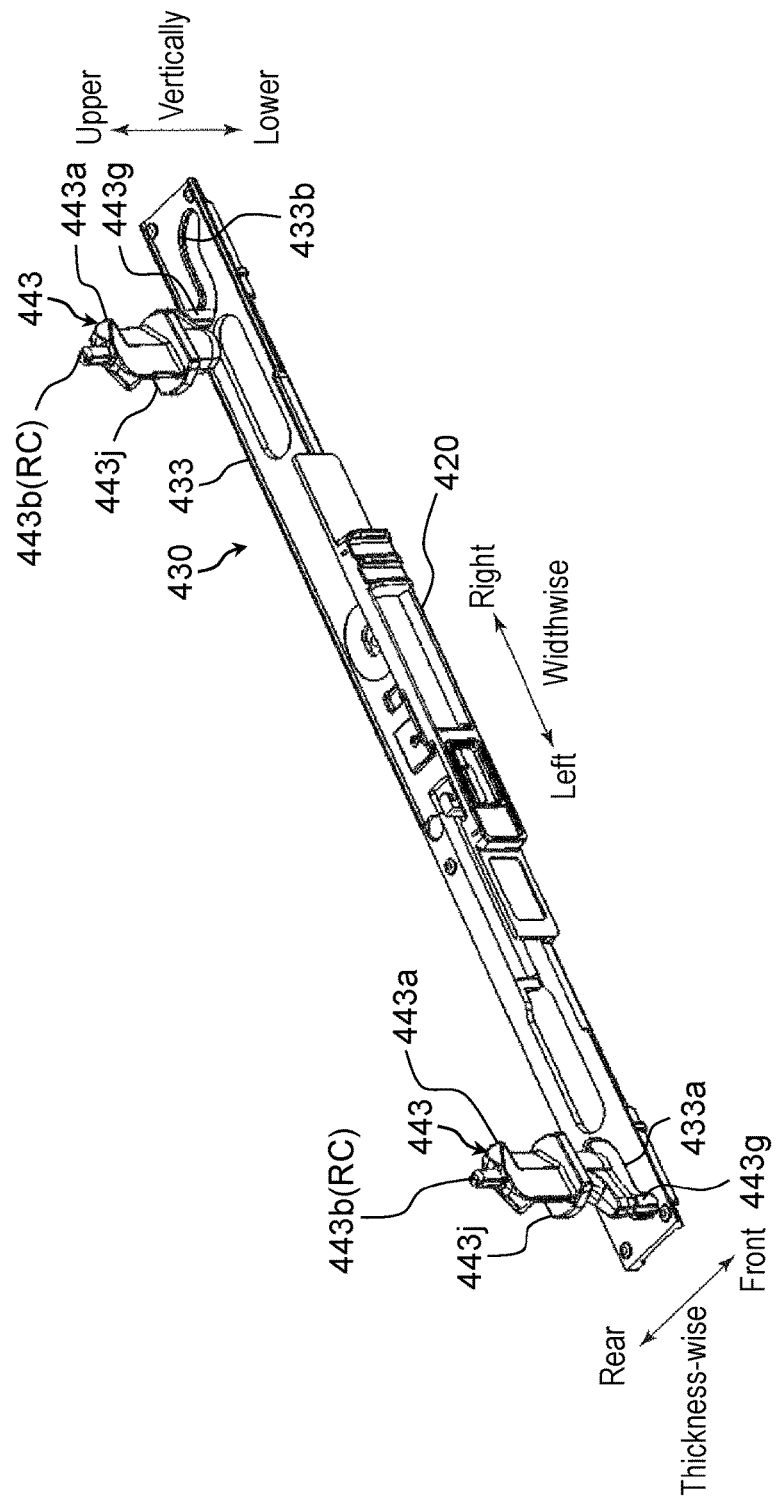
FIG. 17 is an external view of the coupling member, the operating member, and the engagement members of the lock mechanism in the electronic device according to the present exemplary embodiment, and specifically a perspective view illustrating the operating member in a second position and the engagement members in the respective second rotational positions.

Coupling member 433 includes grooves 433a (433b) that respective engagement shafts 443g of engagement members 443 respectively engage for relative movement (see FIGS. 15 and 17).

Groove 433a (433b) is meanderingly formed so that engagement member 443 rotates about rotation axis RC (the axis of rotation shaft 443b) to the first rotational position upon movement of operating member 420 to the first position as shown in FIG. 15 and rotates about rotation axis RC to the second rotational position upon movement of operating member 420 to the second position as shown in FIG. 17. Specifically, groove 433a is formed to have a substantially inverted S-shape so that its widthwise left end is positioned forwardly of its other parts along thickness of coupling member 433, while its widthwise right end is positioned rearwardly of its other parts along the thickness of coupling member 433. On the other hand, groove 433b is formed to have a substantially S-shape so that its widthwise left end is positioned rearwardly of its other parts along the thickness of coupling member 433, while its widthwise right end is positioned forwardly of its other parts along the thickness of coupling member 433.

Returning back to FIGS. 12A to 12F, base member 432 is a member that extends widthwise of socket 400 and is fixed to socket body 410. Base member 432 is made of, for example, resin. Base member 432 includes rotation center shafts 432a and rotation control walls 432b.

Rotation center shafts 432a are respectively inserted into shaft holes 443f that are respectively formed in lower parts of engagement members 443, so that engagement members 443 are rotatably supported at the lower parts.

When engagement members 443 rotate, rotation control walls 432b respectively abut arms 443h that are respectively formed on the lower parts of engagement members 443, thereby each restricting the rotation of engagement member 443 to within a range between the first rotational position and the second rotational position.

Returning back to FIGS. 7A and 7B, support members 431 are respectively disposed about a widthwise left end and a widthwise right end of socket 400. Left and right support members 431 are of symmetrical structure. Each of support members 431 is a plate-shaped member that extends widthwise of socket 400. Support members 431 are fixed to socket body 410. Support members 431 are made of, for example, metal. Support members 431 each include base 431a, engagement member support 431b, and engagement-member disposition hole 431d.

Base 431a is mounted to base member 432 and is fixed to base member 432 and socket body 410 by means of, for example, screws.

Engagement-member disposition hole 431d is a hole that passes through base 431a vertically of socket 400 so that an upper part of engagement member 443 is rotatably disposed. The upper part of engagement member 443 thus projects upward from the upper surface of base 431a.

Engagement member support 431b is erected on base 431a to straddle engagement-member disposition hole 431d widthwise of socket 400. Engagement member support 431b is gate-shaped. Engagement member support 431b has insertion hole 431c that passes through vertically of socket 400. Rotation shaft 443b of engagement member 443 is passed through insertion hole 431c. In this way, engagement member support 431b supports the upper part of engagement member 443, so that engagement member 443 is rotatable about rotation shaft 443b.

Figure 19A:
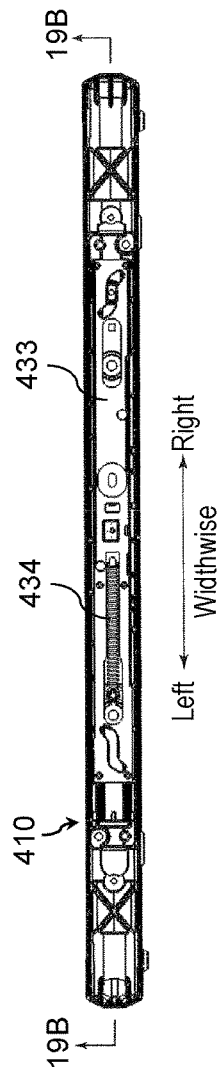
FIG. 19A is an external view of the socket body, the coupling member, and a spring that are the components of the lock mechanism in the electronic device according to the present exemplary embodiment, and specifically a plan view illustrating the operating member in the first position.
Figure 19B:
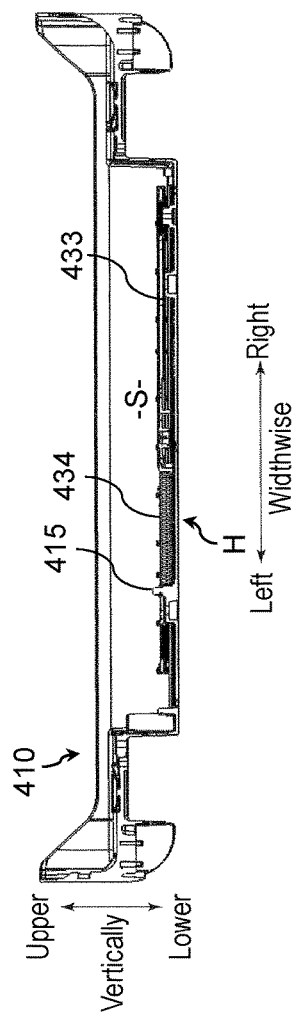
FIG. 19B is a cross-sectional view taken along line 19B-19B of FIG. 19A.
Figure 21A:
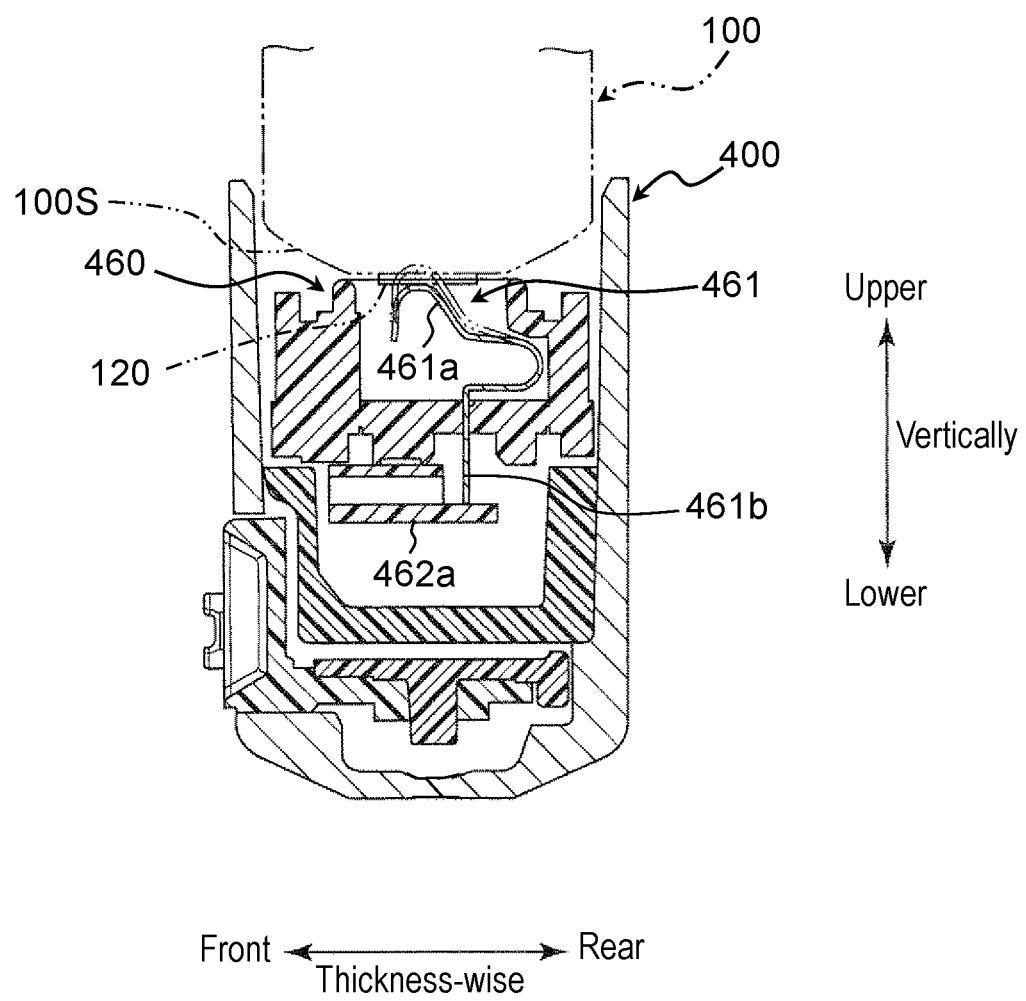
FIG. 21A illustrates a position of a connector pin (in the same cross section as the cross-sectional view of FIG. 10) with the first unit (tablet computer) of the electronic device according to the present exemplary embodiment being mounted in the socket.
Figure 21B:
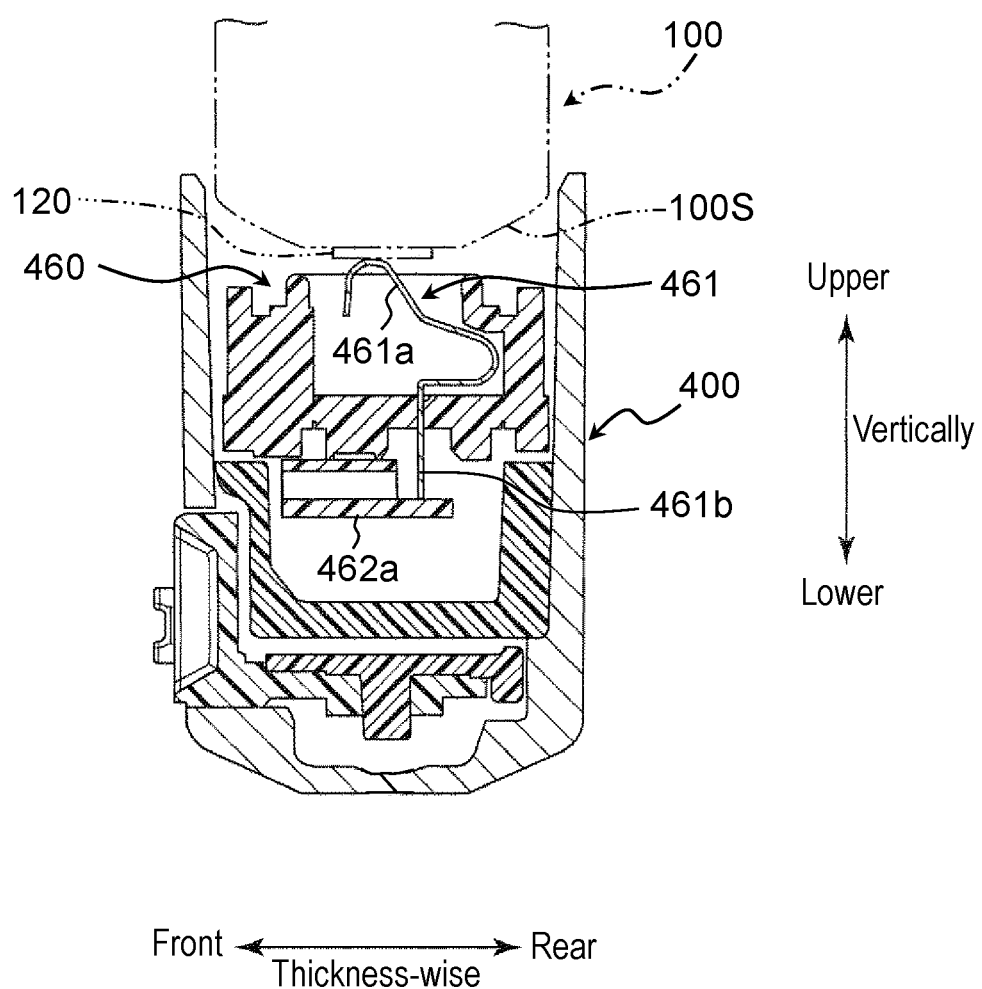
FIG. 21B illustrates the first unit (tablet computer) mounted in the socket being lifted by urging force of the connector pin (in the same cross section as the cross-sectional view of FIG. 10) when unlocked from the socket, in the electronic device according to the present exemplary embodiment.

FIGS. 19A and 19B are external views of socket body 410, coupling member 433, and spring 434 that are the components of the lock mechanism in electronic device 1 according to the present exemplary embodiment. Specifically, FIG. 19A is a plan view illustrating operating member 420 in the first position, while FIG. 19B is a cross-sectional view taken along line 19B-19B of FIG. 19A. FIGS. 20A and 20B are enlarged views of a portion indicated by arrow H of FIG. 19B.

First spring 434 is accommodated in spring housing 433d of coupling member 433. First spring 434 has one end locked to spring lock 433e of coupling member 433 and another end locked to spring lock 415 of socket body 410. First spring 434 urges, widthwise of electronic device 1 toward the first position, coupling member 433 and operating member 420 that is fixed to coupling member 433.

A structure of second spring 451 will be described later.

[1-2-2-4-2. Engagement Member]

Figure 13A:
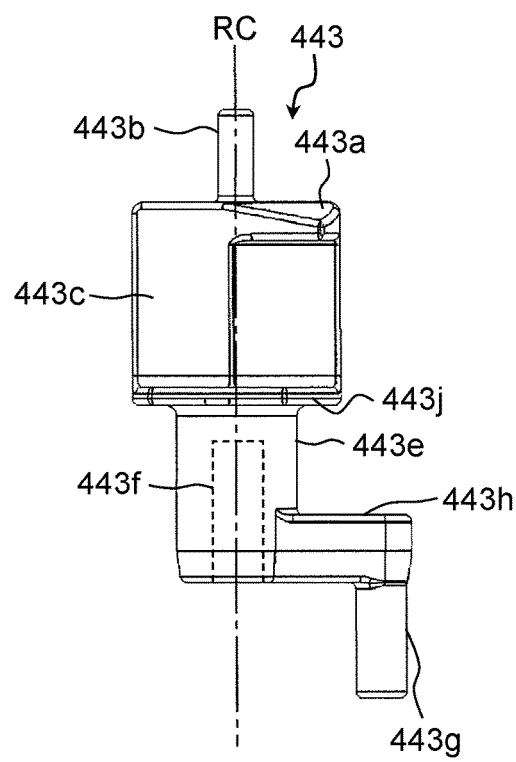
FIG. 13A is an external view of the engagement member of the lock mechanism in the electronic device according to the present exemplary embodiment, and specifically a front view of the engagement member.
Figure 13B:
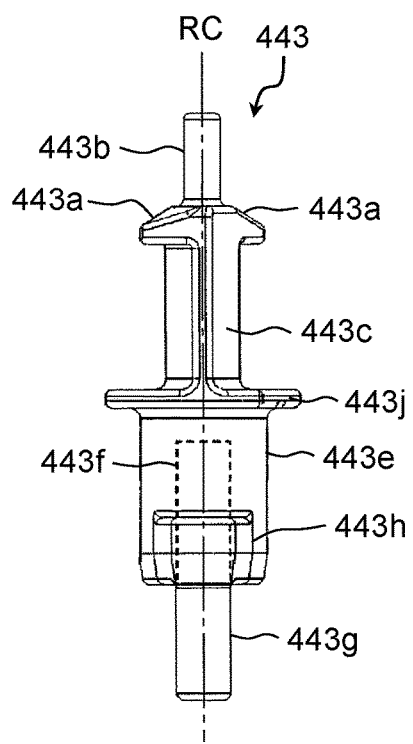
FIG. 13B is an external view of the engagement member of the lock mechanism in the electronic device according to the present exemplary embodiment, and specifically a side view of the engagement member.
Figure 13C:
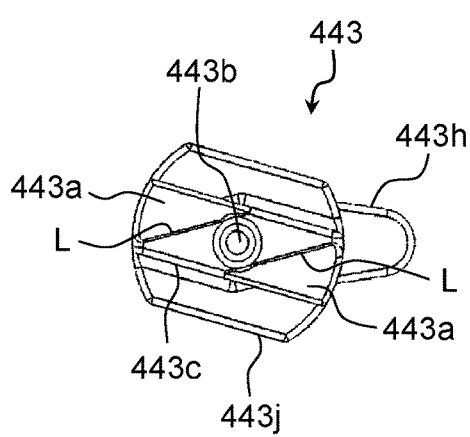
FIG. 13C is an external view or specifically a plan view of the engagement member of the lock mechanism in the electronic device according to the present exemplary embodiment.

FIGS. 13A, 13B, and 13C are external views of engagement member 443 of the lock mechanism in electronic device 1 according to the present exemplary embodiment. Specifically, FIG. 13A is a front view, FIG. 13B is a side view, and FIG. 13C is a plan view.

As shown in FIGS. 13A, 13B, and 13C, engagement member 443 includes, from top to bottom, above-mentioned rotation shaft 443b, engagement body 443c, fitting protrusion 443j, cylinder 443e, arm 443h, and engagement shaft 443g.

Rotation shaft 443b is provided at an upper end of engagement member 443.

Engagement body 443c includes the pair of engagement projections 443a that is formed to project in radially opposite directions with rotation shaft 443b between engagement projections 443a. Engagement projections 443a are formed by cutting off parallel side parts of a cylinder with rotation shaft 443b (rotation axis RC) between the parallel side parts and then shaving off, except for a part near a top of the cylinder, radially outer parts with respect to respective lines indicated by L.

Cylinder 443e has shaft hole 443f that opens toward a lower edge of cylinder 443e. Shaft hole 443f is formed coaxially with rotation shaft 443b.

Arm 443h extends radially outward from a lower end of cylinder 443e.

Engagement shaft 443g extends downward from a radially outer end of arm 443h to be parallel to rotation shaft 443b (rotation axis RC).

Fitting protrusion 443j is formed at an upper edge of cylinder 443e to protrude radially. As can be seen from FIG. 13C, fitting protrusion 443j of engagement member 443 has, when viewed axially, such a shape that parallel side parts of a disk are cut off with rotation axis RC between the parallel side parts.

Figure 13D:
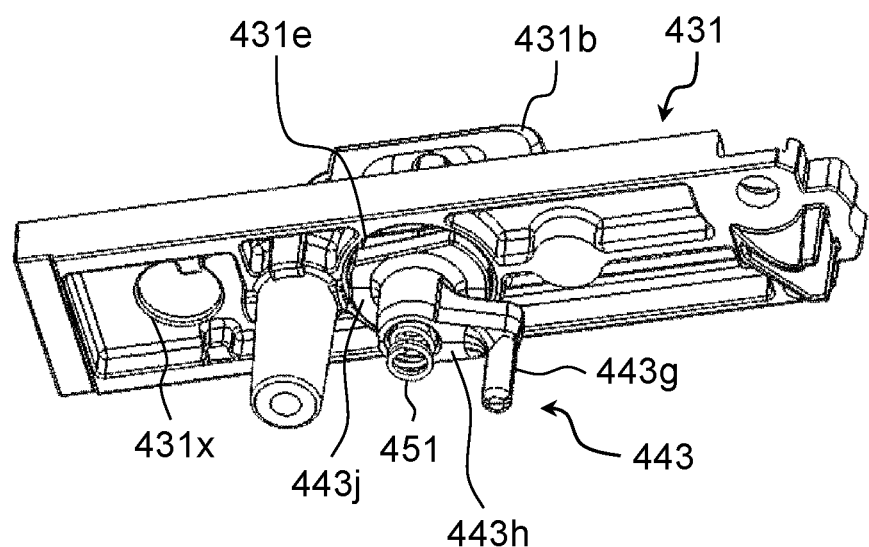
FIG. 13D is an external view or specifically a bottom perspective view of a support member, the engagement member, and a spring that are the components of the lock mechanism in the electronic device according to the present exemplary embodiment.
Figure 13E:
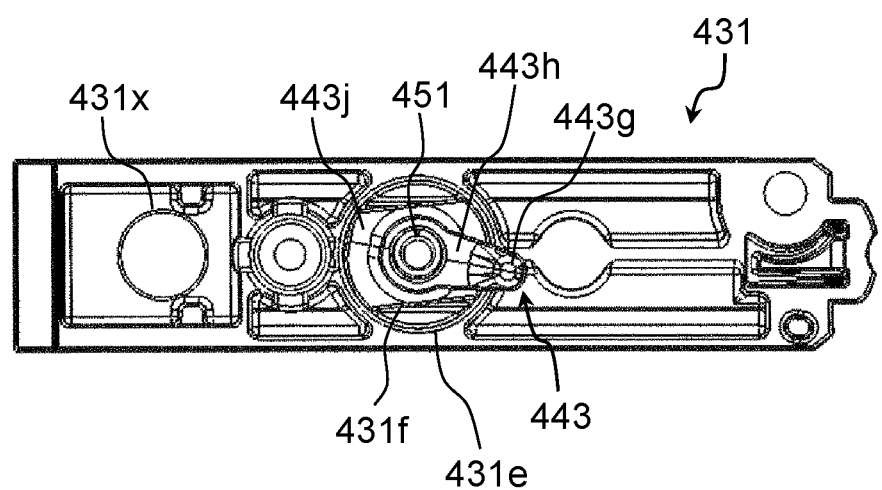
FIG. 13E is an external view of the support member, the engagement member, and the spring of the lock mechanism in the electronic device according to the present exemplary embodiment, and specifically a bottom view of the support member, the engagement member, and the spring.

FIGS. 13D and 13E are external views of support member 431, engagement member 443, and second spring 451 that are the components of the lock mechanism in electronic device 1 according to the present exemplary embodiment. Specifically, FIG. 13D is a bottom perspective view, while FIG. 13E is a bottom view.

Support member 431 is provided with, in its underside, first fitting recess 431e and second fitting recess 431f.

First fitting recess 431e is circular in shape when viewed along the underside of support member 431. A diameter of first fitting recess 431e that is circular is set slightly greater than a diameter of fitting protrusion 443j of engagement member 443, so that fitting protrusion 443j of engagement member 443 is rotatable about rotation axis RC while fitted in first fitting recess 431e.

When viewed along the underside of support member 431, second fitting recess 431f has substantially the same shape as fitting protrusion 443j of engagement member 443 that is viewed along rotation axis RC, and a size of second fitting recess 431f is set slightly larger than a size of fitting protrusion 443j of engagement member 443, so that fitting protrusion 443j of engagement member 443 can fit in second fitting recess 431f when engagement member 443 is in the second rotational position. In other words, with fitting protrusion 443j of engagement member 443 fitted in second fitting recess 431f, engagement member 443 cannot rotate about rotation axis RC. FIGS. 13D and 13E illustrate fitting protrusion 443j of engagement member 443 that has rotated slightly from the first rotational position toward the second rotational position within first fitting recess 431e.

Figure 14A:
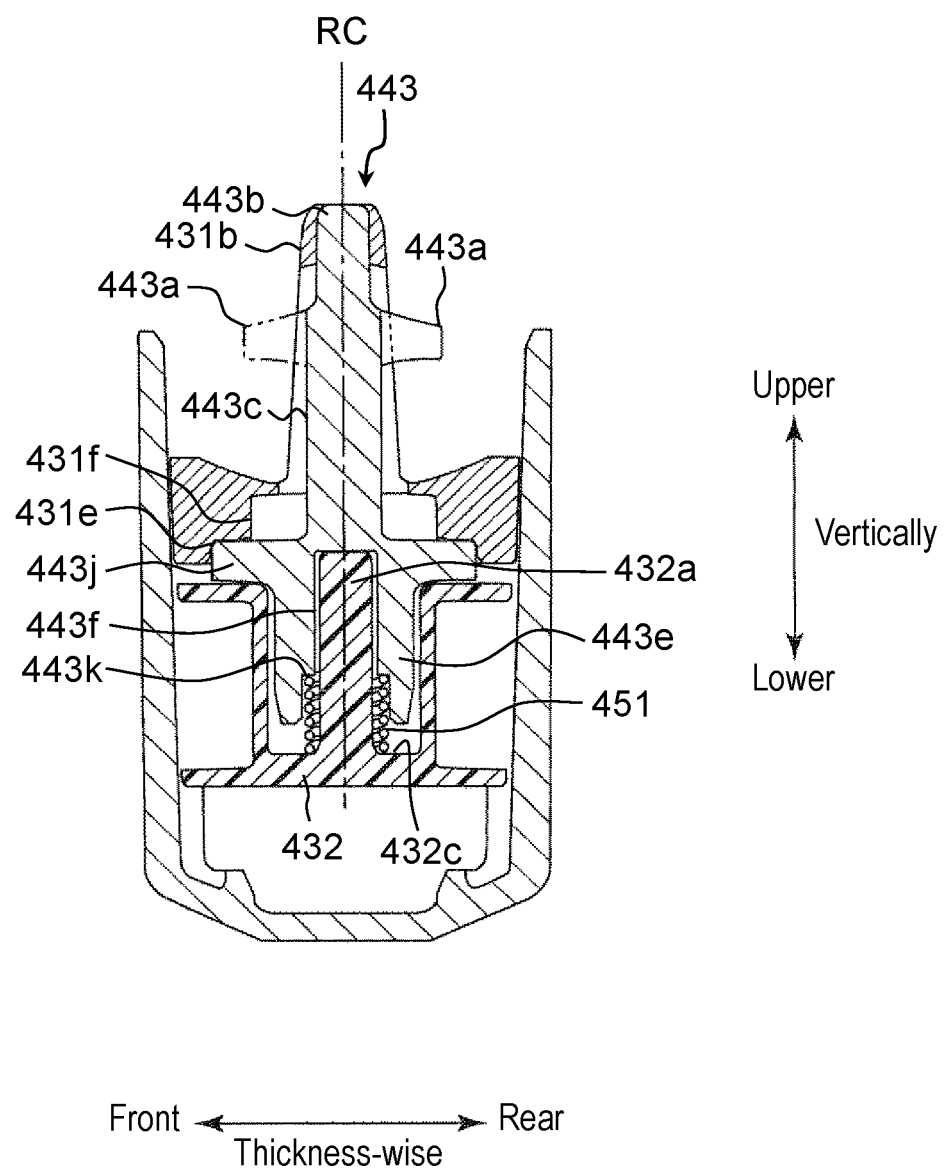
FIG. 14A is a cross-sectional view taken along line 14A-14A of FIG. 12B.
Figure 14B:
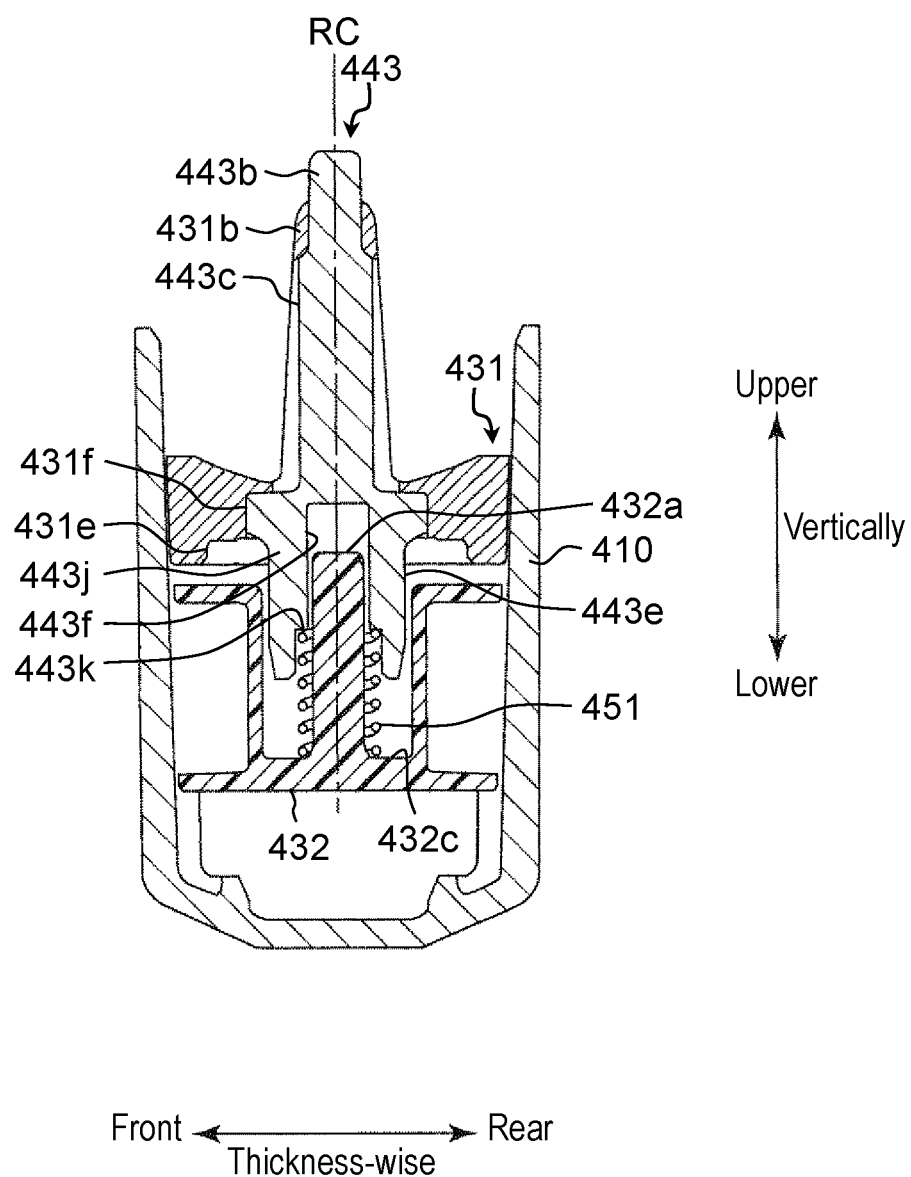
FIG. 14B is a cross-sectional view taken along line 14B-14B of FIG. 12E.

FIG. 14A is a cross-sectional view taken along line 14A-14A of FIG. 12B. FIG. 14A illustrates operating member 420 in the first position and engagement member 443 in the first rotational position. FIG. 14B is a cross-sectional view taken along line 14B-14B of FIG. 12E. FIG. 14B illustrates operating member 420 in the second position and engagement member 443 in the second rotational position. Note that these figures are supplemented with the members shown in FIGS. 12A to 12F for convenience of explanation. Rotation shaft 443b of engagement member 443 is passed through insertion hole 431c. Shaft hole 443f fits rotation center shaft 432a of base member 432. As described above, shaft hole 443f is formed coaxially with rotation shaft 443b. Therefore, engagement member 443 is rotatable on, as rotation axis (center) RC, a center of rotation shaft 443b and a center of shaft hole 443f.

Second spring 451 is formed of a coil spring and is fitted over rotation center shaft 432a of base member 432. Second spring 451 has one end abutting on bottom face 432c of base member 432 and another end abutting on spring abutment 443k that is formed by stepping shaft hole 443f of engagement member 443. Second spring 451 urges engagement member 443 toward a second axial position along rotation axis RC.

Returning back to FIG. 10, connector 460 includes connector body 462 and connector pins 461. The plurality of connector pins 461 are arranged in parallel in the extending direction of socket 400 (along the width of electronic device 1) (see FIG. 7A). In the present exemplary embodiment, about twenty connector pins 461 are arranged.

Connector pins 461 each include base part 461b and electrode part 461a. Base part 461b extends vertically in a substantially linear manner and has one end abutting on pin support 462a of connector body 462. Electrode part 461a is a part that comes into contact with an electrode part of connector 120 of first unit 100 and is formed to have a shape of a spring that extends from another end of base part 461b in a gently curving manner. Elastic material is used for forming connector pins 461. When the electrode part of connector 120 of first unit 100 is pressed against electrode part 461a, an upper portion of electrode part 461a is pushed downward through elastic deformation. For this reason, with first unit 100 being mounted in socket 400, the plurality of connector pins 461 urge first unit 100 in a direction that demounts first unit 100 (upward) from socket 400. Such urging force is of magnitude that can lift up first unit 100 that is fitted into socket 400 but not locked.

[1-2-2-4-3. Actions of Lock Mechanism]

Figure 16A:
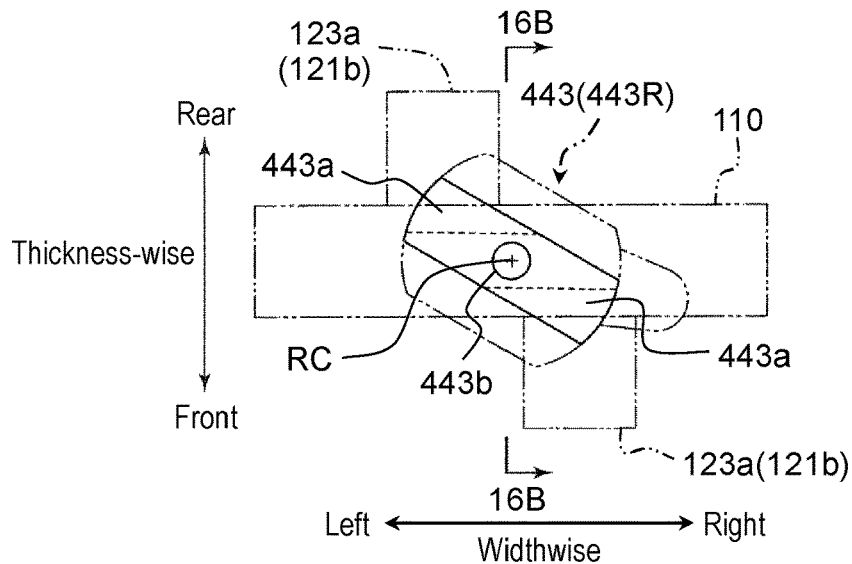
FIG. 16A is a view illustrating engagement achieved by the lock mechanism of the electronic device according to the present exemplary embodiment, and specifically a plan view illustrating the engagement.
Figure 16B:
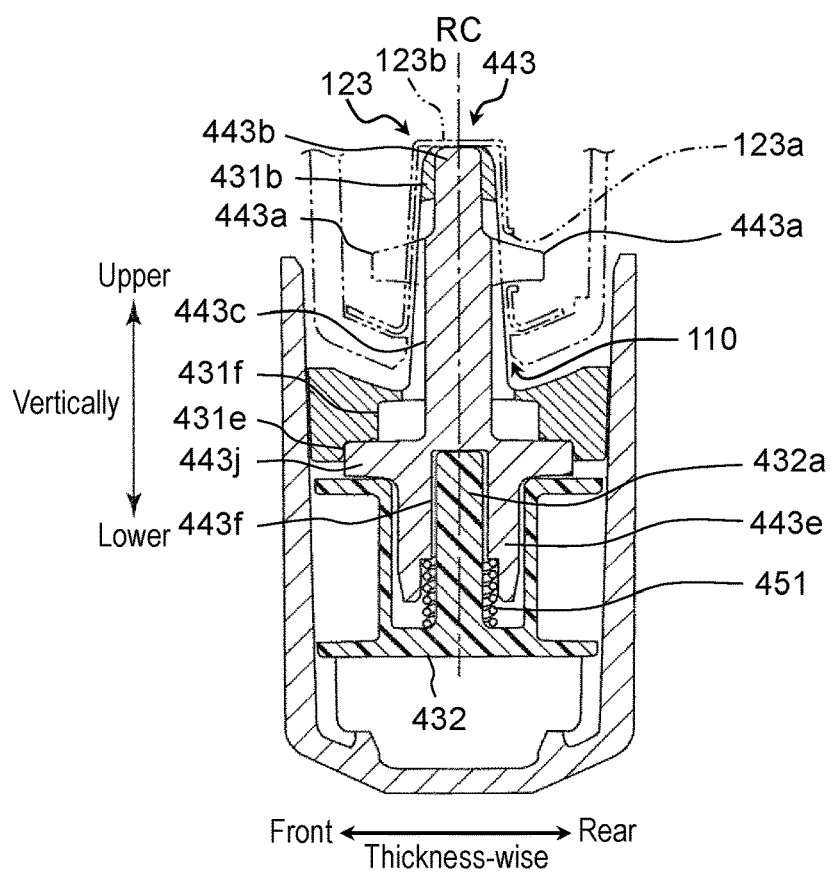
FIG. 16B is a cross-sectional view taken along line 16B-16B of FIG. 16A (and is based on the cross-sectional view of FIG. 14A, having the engaging target part added)

FIG. 15 is an external view of coupling member 433, operating member 420, and engagement members 443 that are the components of the lock mechanism of electronic device 1 according to the present exemplary embodiment. Specifically, FIG. 15 is a perspective view illustrating operating member 420 in the first position and engagement members 443 in their respective first rotational positions. FIGS. 16A and 16B illustrate engagement achieved by a widthwise right-side lock mechanism in the lock mechanism of electronic device 1 according to the present exemplary embodiment. Specifically, FIG. 16A is a plan view illustrating the engagement, while FIG. 16B is a cross-sectional view taken along line 16B-16B of FIG. 16A.

As shown in FIG. 15, when operating member 420 is in the first position, respective engagement shafts 443g of engagement members 443 are respectively positioned in the respective right ends of grooves 433a, 433b of coupling member 433. Engagement shaft 443g of widthwise right-side engagement member 443 is caused to rotate in a thickness-wise frontward direction by groove 433b, while engagement shaft 443g of widthwise left-side engagement member 443 is caused to rotate in a thickness-wise rearward direction by groove 433a. In this way, engagement members 443 are positioned in their respective first rotational positions. This is when engagement projections 443a of each of engagement members 443 respectively engage in engagement recesses 121b of engaging target part 110 of first unit 100 as shown in FIGS. 16A, 16B, whereby first unit 100 is locked to socket 400. Here, rotation shaft 443b of engagement member 443 abuts, at its upper edge, against flat part 123b of protective member 123 in recess 121a of first unit 100, so that engagement member 443 is pushed downward against urging force of second spring 451, thus being positioned in a first axial position. Moreover, fitting protrusion 443j fits in first fitting recess 431e of support member 431.

When operating member 420 is moved to the second position from this position, a condition shown in FIGS. 17, 18A, and 18B is achieved. FIG. 17 is an external view of coupling member 433, operating member 420, and engagement members 443 of the lock mechanism in electronic device 1 according to the present exemplary embodiment, and specifically a perspective view illustrating operating member 420 in the second position and engagement members 443 in their respective second rotational positions. FIGS. 18A and 18B illustrate disengagement achieved by the widthwise right-side lock mechanism in the lock mechanism of electronic device 1 according to the present exemplary embodiment. Specifically, FIG. 18A is a plan view illustrating the disengagement, while FIG. 18B is a cross-sectional view taken along line 18B-18B of FIG. 18A.

As shown in FIG. 17, when operating member 420 is in the second position, respective engagement shafts 443g of engagement members 443 are respectively positioned in the respective left ends of grooves 433a, 433b of coupling member 433. Engagement shaft 443g of widthwise right-side engagement member 443 is caused to rotate in the thickness-wise rearward direction by groove 433b, while engagement shaft 443g of widthwise left-side engagement member 443 is caused to rotate in the thickness-wise frontward direction by groove 433a. In this way, engagement members 443 are positioned in their respective second rotational positions. This is when engagement projections 443a of each of engagement members 443 are respectively disengaged from engagement recesses 121b of engaging target part 110 of first unit 100 as shown in FIGS. 18A, 18B, whereby first unit 100 is unlocked from socket 400 and can be removed from second unit 200.

Note that first unit 100 is urged upward by connector pins 461 of connector 460 of socket 400 via connector 120. Therefore, first unit 100 thus unlocked is pushed upward by the urging force of connector pins 461. Moreover, engagement members 443 are urged upward by the urging force of corresponding second springs 451 and are in their respective second rotational positions. In order to direct first unit 100 upward, engagement members 443 are each pushed upward (toward the second axial position) by the urging force of second spring 451, whereby fitting protrusion 443j fits in second fitting recess 431f of support member 431. In this way, the rotation of engagement member 443 on rotation axis RC is restricted. Accordingly, engagement members 443 are kept unlocked from engaging target parts 110, respectively. For this reason, the user is not required to keep holding operating member 420 with operating member 420 moved to the second position (unlocked position). This eliminates the need to hold operating member 420 in the second position (unlocked position) with one hand while pulling first unit 100 out of socket 400 with the other hand. In other words, the need to remove first unit 100 with both hands is eliminated. Because operating member 420 is kept in the second position (unlocked position), the user can visually recognize that the lock mechanism is currently in an unlocked state.

A description is given next of cases where socket 400 that is not mounted with first unit 100 is mounted with first unit 100. As first unit 100 is inserted into socket 400, flat part 123b of protective member 123 of first unit 100 abuts first against the upper edge of rotation shaft 443b of engagement member 443. As first unit 100 is inserted further into socket 400, flat part 123b of protective member 123 that abuts against the upper edge of rotation shaft 443b of engagement member 443 pushes engagement member 443 downward. When fitting protrusion 443j of engagement member 443 is pushed down from second fitting recess 431f to first fitting recess 431e of support member 431, that is to say, when engagement member 443 is pushed down to the first axial position, fitting protrusion 443j of engagement member 443 is disengaged from second fitting recess 431f of support member 431, whereby the rotation of engagement member 443 is unrestricted. Engagement member 443 thus becomes rotatable about rotation axis RC within first fitting recess 431e. As engagement member 443 becomes rotatable, coupling member 433 having groove 433a, 433b engaging engagement shaft 443g of engagement member 443 becomes movable widthwise of electronic device 1. As described above, coupling member 433 is urged (pulled) by first spring 434 toward the first position of operating member 420. Accordingly, coupling member 433 and operating member 420 connected to coupling member 433 move to the first position. With the movement of coupling member 433, engagement members 443 rotate to the first rotational positions, respectively. Therefore, engagement projections 443a of each of engagement members 443 respectively engage in engagement recesses 121b of engaging target part 110 of first unit 100 as shown in FIGS. 16A, 16B. First unit 100 is thus locked to socket 400.

Note that when the user mounts first unit 100 in socket 400, there are cases where one of the ends of lower side part 100S of first unit 100 in the extending direction of lower side part 100S is fully inserted into socket 400, while the other end of lower side part 100S is not fully inserted into socket 400. In these cases, engagement member 443 corresponding to the other end of lower side part 100S is not pushed down by flat part 123b of protective member 123 of first unit 100, so that fitting protrusion 443j of engagement member 443 corresponding to the other end of lower side part 100S is not disengaged from second fitting recess 431f of support member 431. Therefore, engagement member 443 corresponding to the other end of lower side part 100S cannot rotate. Consequently, coupling member 433 and operating member 420 connected to coupling member 433 do not move to the first position. Based on the fact that operating member 420 has not moved to the first position, the user can visually recognize that first unit 100 is not locked to socket 400. Accordingly, the user is expected to insert first unit 100 properly into socket 400. In this way, carrying of electronic device 1 with first unit 100 not fully locked to socket 400 is suppressed.

[1-3. Dust Discharge Mechanism]

In an electronic device of detachable structure, it is easy for dust to enter the device through engagement holes and the like. With electronic device 1 of the present exemplary embodiment, dust may enter socket 400 through engagement-member disposition holes 431d and the like. Accordingly, the dust that has entered can be appropriately disposed in the present exemplary embodiment.

[1-3-1. Structure]

With reference to above-mentioned FIGS. 20A and 20B and FIGS. 22, 23, a description is given of dust discharge mechanism 600 of the present exemplary embodiment. FIG.

Figure 23:
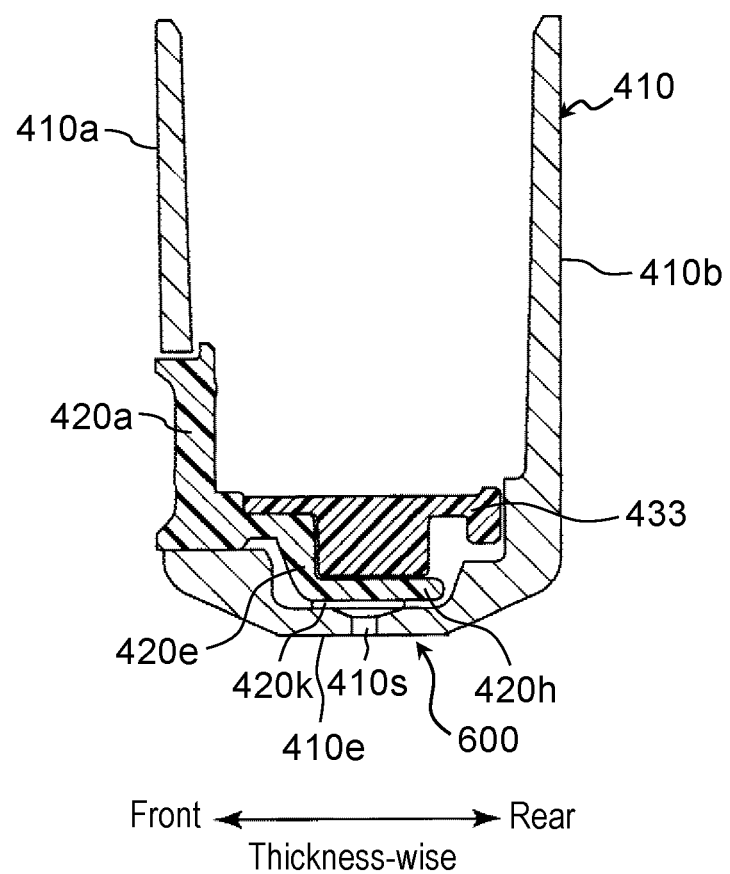
FIG. 23 is a cross-sectional view taken along line 23-23 of FIG. 20B.

22 illustrates dust scrapers of 420*j*, 420*k*, 433*i*, 433*j*, 433*k* of dust discharge mechanism 600 that are provided to coupling member 433 and operating member 420 of electronic device 1 according to the present exemplary embodiment. FIG. 23 is a cross-sectional view taken along line 23-23 of FIG. 20B.

To cope with the above problem, electronic device 1 includes dust discharge mechanism 600 that discharges dust that has entered socket 400 out of socket 400. Dust discharge mechanism 600 is configured to discharge dust out of socket 400 in conjunction with operation of operating member 420. A structure of dust discharge mechanism 600 is described in detail below.

As shown in FIGS. 20A, 20B, 23, bottom part 410*e* of socket body 410 is formed with dust discharge hole 410*s* that is formed of a through hole for communication between an interior and an exterior of socket 400. Dust discharge hole 410*s* is provided for the purpose of discharging dust that enters socket 400. Dust discharge hole 410*s* is a hole that is long along the width (length) of socket 400. This is for the purpose of facilitating dust discharge when the plurality of dust scrapers 420*j*, 420*k*, 433*i*, 433*j*, 433*k*, which are described later, move along the width (length) of socket 400.

Figure 22:
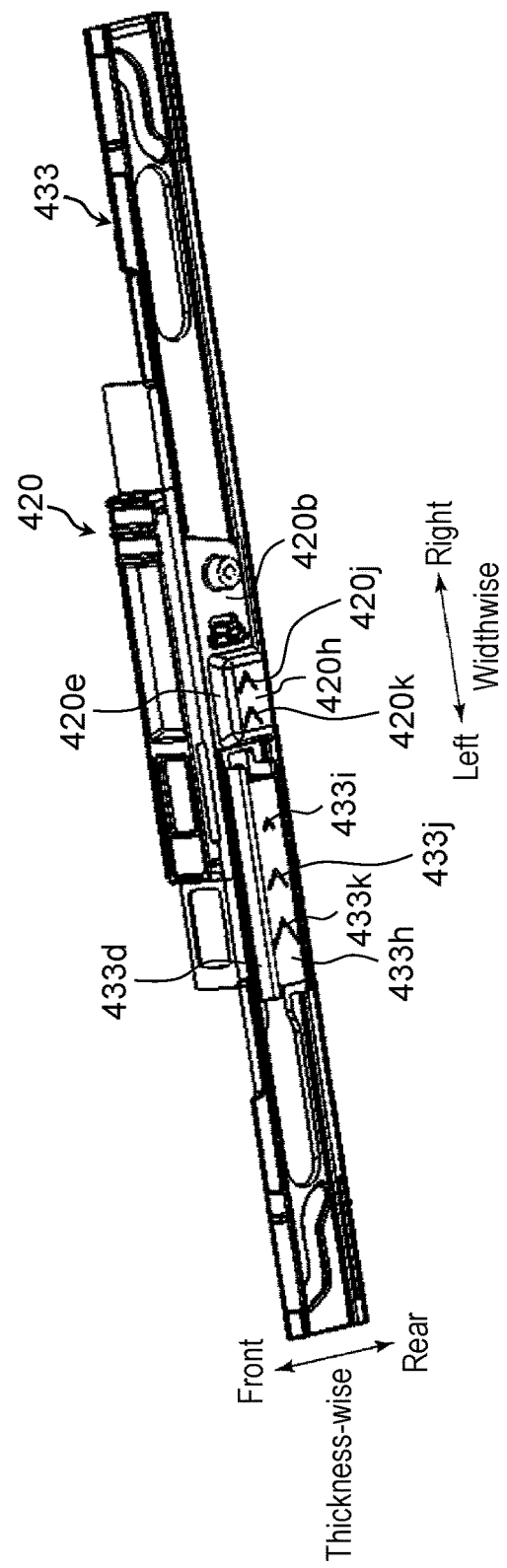
FIG. 22 illustrates dust scrapers of a dust discharge mechanism that are provided to the coupling member and the operating member in the electronic device according to the present exemplary embodiment.

As shown in FIGS. 20A, 20B, 22, operating member 420 is provided with recess 420*e* formed to be recessed downward from connecting part 420*b*. Bottom part 420*h* of recess 420*e* is formed to be substantially flat and faces bottom part 410*e* of socket body 410 across a minute clearance.

Bottom part 433*h* of spring housing 433*d* of coupling member 433 is formed to be substantially flat and faces bottom part 410*e* of socket body 410 across a minute clearance.

Bottom part 420*h* of recess 420*e* and bottom part 433*h* of spring housing 433*d* are provided with, along moving directions of coupling member 433 (along the width of socket 400), first to fifth dust scrapers 420*j*, 420*k*, 433*i*, 433*j*, 433*k* that are spaced apart from one another. First dust scraper 420*j* and second dust scraper 420*k* are formed on bottom part 420*h* of recess 420*e*. Third dust scraper 433*i*, fourth dust scraper 433*j*, and fifth dust scraper 433*k* are formed on bottom part 433*h* of spring housing 433*d*.

Dust scrapers 420*j*, 420*k*, 433*i*, 433*j*, 433*k* are formed to each have a length that is slightly greater than a length of the above clearance between bottom part 420*h* of recess 420*e* and bottom part 410*e* of socket body 410 as well as between bottom part 433*h* of spring housing 433*d* and bottom part 410*e* of socket body 410 to project toward bottom part 410*e* of socket body 410. The length that is slightly greater means that dust scrapers 420*j*, 420*k*, 433*i*, 433*j*, 433*k* come into contact with bottom part 410*e* of socket body 410 with coupling member 433 smoothly slidable relative to socket body 410.

When viewed in a direction perpendicular to bottom part 420*h* of recess 420*e* and bottom part 433*h* of spring housing 433*d*, dust scrapers 420*j*, 420*k*, 433*i*, 433*j*, 433*k* each have substantially the shape of a greater-than sign ">" that is open at one side and closed at another side along the moving directions of coupling member 433 (along the width of socket 400).

First dust scraper 420*j* and second dust scraper 420*k* are formed to be substantially the same size.

In contrast, third dust scraper 433*i*, fourth dust scraper 433*j*, and fifth dust scraper 433*k* are formed to increase in size in this order. More specifically, when coupling member 433 is in a first widthwise position that is described later, fifth dust scraper 433*k*, fourth dust scraper 433*j*, and third dust scraper 433*i* are formed to decrease in size with decreasing distance to dust discharge hole 410*s*.

First dust scraper 420*j* and second dust scraper 420*k* are formed in positions where first dust scraper 420*j* and second dust scraper 420*k* pass over dust discharge hole 410*s* when operating member 420 is moved from the first position to the second position.

[1-3-3. Action of Dust Discharge Mechanism]

When operating member 420 is operated, with first unit 100 being mounted in socket 400 as shown in FIG. 1, for removal of first unit 100 from socket 400, operating member 420 moves widthwise of socket 400 from the first position to the second position. Accordingly, in conjunction with the movement of operating member 420, coupling member 433 fixed to operating member 420 moves widthwise of socket 400 from the first widthwise position (position of coupling member 433 when operating member 420 is in the first position) that is shown in FIG. 20A to a second widthwise position (position of coupling member 433 when operating member 420 is in the second position) that is shown in FIG. 20B. During this movement, first dust scraper 420*j* and second dust scraper 420*k* move from a widthwise left side to a widthwise right side of dust discharge hole 410*s*. In other words, first dust scraper 420*j* and second dust scraper 420*k* pass over dust discharge hole 410*s*. Therefore, dust that is present on respective widthwise right sides of first dust scraper 420*j* and second dust scraper 420*k* on an upper surface of bottom part 410*e* of socket body 410 when coupling member 433 is in the first widthwise position is pushed in a widthwise rightward direction by first dust scraper 420*j* and second dust scraper 420*k*. When this dust reaches above dust discharge hole 410*s*, this dust falls outwardly of socket 400 through dust discharge hole 410*s*. This means that the dust that is present on the respective widthwise right sides of first dust scraper 420*j* and second dust scraper 420*k* inside socket 400 when coupling member 433 is in the first widthwise position is discharged out of socket 400.

When operating member 420 is operated as described above, third dust scraper 433*i*, fourth dust scraper 433*j*, and fifth dust scraper 433*k* move from a widthwise left side to a widthwise right side of a region that is positioned on the widthwise left side of dust discharge hole 410*s*. This is when dust that is present on respective widthwise right sides of third dust scraper 433*i*, fourth dust scraper 433*j*, and fifth dust scraper 433*k* on the upper surface of bottom part 410*e* of socket body 410 when coupling member 433 is in the first widthwise position is pushed in the widthwise rightward direction by third dust scraper 433*i*, fourth dust scraper 433*j*, and fifth dust scraper 433*k*. Here, third dust scraper 433*i* moves to a neighborhood of a position where second dust scraper 420*k* is when coupling member 433 is in the first widthwise position. Note that the dust is fine and light, so that when pushed in the widthwise rightward direction by third dust scraper 433*i*, fourth dust scraper 433*j*, and fifth dust scraper 433*k*, the dust moves, for example, scatters to a widthwise right side of an end positioned widthwise to the right of third dust scraper 433*i*. Therefore, the dust moves to a neighborhood of dust discharge hole 410*s*.

When viewed in the direction perpendicular to bottom part 420*h* of recess 420*e* and bottom part 433*h* of spring housing 433*d*, dust scrapers 420*j*, 420*k*, 433*i*, 433*j*, 433*k* each have, as described above, substantially the shape of the greater-than sign ">" that is open at the one side (widthwise left side) and closed at the other side (widthwise right side) along the moving directions of coupling member 433 (along the width of socket 400). For this reason, as dust scrapers 420*j*, 420*k*, 433*i*, 433*j*, 433*k* move in the widthwise rightward direction with their closed sides as leading ends, the dust is smoothly shoved aside and is caught by the rear (widthwise left side) dust scrapers in the moving direction. Thus, the dust is unlikely to converge on one spot. As a result, increase in sliding friction between coupling member 433 and socket body 410 as well as between operating member 420 and socket body 410 is suppressed during the movement, whereby effect on operability of operating member 420 is suppressed.

When released from the above operation, operating member 420 is returned from the second position to the first position by urging force of spring 434. That is when dust positioned on the widthwise right side of dust discharge hole 410s is pushed in a widthwise leftward direction by first dust scraper 420j and second dust scraper 420k, thereby being discharged out of socket 400 through dust discharge hole 410s.

As described above, third dust scraper 433i, fourth dust scraper 433j, and fifth dust scraper 433k are formed to increase in size in this order. More specifically, when coupling member 433 is in the first widthwise position, dust scrapers 433k, 433j, 433i are formed to decrease in size with decreasing distance to dust discharge hole 410s. In contrast, if third dust scraper 433i that is positioned close to dust discharge hole 410s is formed to be larger, dust is taken by third dust scraper 433i and is returned in the widthwise leftward direction when third dust scraper 433i returns in the widthwise leftward direction. This means that when operating member 420 is moved in the widthwise rightward and leftward directions, the dust is moved in the widthwise rightward and leftward directions, thus not being discharged properly. To avoid this, in the present exemplary embodiment, dust scrapers 433k, 433j, 433i are formed to decrease in size with decreasing distance to dust discharge hole 410s. In this way, dust is inhibited from being taken and returned when third dust scraper 433i, fourth dust scraper 433j, and fifth dust scraper 433k return in the widthwise leftward direction.

When operating member 420 is operated at a next opportunity, the dust that has been moved to the neighborhood of dust discharge hole 410s by third dust scraper 433i, fourth dust scraper 433j, and fifth dust scraper 433k in the previous operation is, as described above, pushed in the widthwise rightward direction by first dust scraper 420j and second dust scraper 420k, thereby being discharged out of socket 400 through dust discharge hole 410s.

As described above, in the present exemplary embodiment, even in cases where dust has entered socket 400 and accumulates on, for example, bottom part 410e of socket body 410, the dust is moved by dust scrapers 420j, 420k, 433i, 433j, 433k during operation of operating member 420, thereby being discharged from dust discharge hole 410s. Continuous accumulation of dust inside socket 400 is thus suppressed.

According to the structure as described above, the dust is discharged simultaneously with the operation of operating member 420, so that trouble that is taken to consciously discharge dust is reduced. In addition, the need to disassemble socket 400 or the need to clean with a special jig or the like for dust discharge is reduced.

[2. Effects and the Like]

Electronic device 1 of the present exemplary embodiment includes first unit 100 including display 101, and second unit 200 including the input part, first unit 100 and second unit 200 being formed to be detachable.

Second unit 200 further includes socket 400 that is capable of accommodating side part 100S of first unit 100.

Socket 400 includes the lock mechanism configured to detachably lock first unit 100 with second unit 200, operating member 420 configured to operate the lock mechanism, and dust discharge mechanism 600 configured to discharge dust that has entered socket 400 out of socket 400 in conjunction with operation of operating member 420.

Thus, the dust that has entered socket 400 can be discharged out of socket 400 in conjunction with the operation of operating member 420.

In the present exemplary embodiment, dust discharge mechanism 600 includes dust scrapers 420j, 420k, 433i, 433j, 433k, formed on coupling member (moving member) 433 and operating member (moving member) 420 that move inside socket 400 in conjunction with the operation of operating member 420, for moving the dust inside socket 400, and dust discharge hole 410s formed in socket body (case) 410 of socket 400 so that the dust moved by dust scrapers 420j, 420k, 433i, 433j, 433k is discharged out of socket 400.

With this simple structure, the dust that has entered socket 400 can be discharged out of socket 400 in conjunction with the operation of operating member 420.

In the present exemplary embodiment, the plurality of dust scrapers 420j, 420k, 433i, 433j, 433k are formed spaced apart from one another along the moving directions of coupling member (moving member) 433 and operating member (moving member) 420, and the plurality of dust scrapers 420j, 420k, 433i, 433j, 433k decrease in size with decreasing distance to dust discharge hole 410s.

In this way, the dust is inhibited from being taken and returned when the plurality of dust scrapers 420j, 420k, 433i, 433j, 433k return in the widthwise leftward direction.

Other Exemplary Embodiments

The first exemplary embodiment has been described above as being illustrative of the technique of the present disclosure, but the technique of the present disclosure is not limited thereto. The technique of the present disclosure is also applicable to exemplary embodiments including appropriate modifications, replacements, additions, and omissions.

A description is hereinafter given of those other exemplary embodiments.

In the first exemplary embodiment, dust scrapers 420j, 420k, 433i, 433j, 433k each have the shape of the greater-than sign ">". However, the shape of each of dust scrapers 420j, 420k, 433i, 433j, 433k is not limited thereto. For example, dust scrapers 420j, 420k, 433i, 433j, 433k may each have the shape of a right parenthesis ")", a combination of the greater-than sign ">" and the right parenthesis ")", or a combination of other shapes. Moreover, instead of five dust scrapers as in the first exemplary embodiment, four or less or six or more dust scrapers may be used.

The exemplary embodiments have been described above as being illustrative of the technique of the present disclosure, and the appended drawings and the detailed description have been provided for this purpose.

For illustration of the above technique, the constituent elements that are shown in the appended drawings and are described in the detailed description can include not only constituent elements that are essential for solving the problem but also constituent elements that are not essential for solving the problem. For this reason, those nonessential constituent elements that are shown in the appended drawings and are described in the detailed description should not immediately be acknowledged as essential.

In addition, because the above exemplary embodiments are intended to be illustrative of the technique of the present disclosure, various modifications, replacements, additions, omissions, and the like can be made within the scope of the claims or equivalents of the claims.

The present disclosure can be used widely in electronic devices each including a first unit and a second unit that are formed to be detachable.

What is claimed is:

1. An electronic device comprising:
    a first unit including a display; and
    a second unit including an input part,
    the input part allowing a user to perform input processing,
        the input processing being output to the first unit including the display,
        and
        a dust discharge mechanism configured to discharge dust that has entered the socket out of the socket in conjunction with operation of the operating member.

2. The electronic device according to claim 1, wherein
the dust discharge mechanism includes
    a scraper formed on a moving member that moves inside the socket in conjunction with the operation of the operating member, the scraper being configured to move the dust inside the socket, and
    a dust discharge hole formed in a case of the socket so that the dust moved by the scraper is discharged out of the socket through the dust discharge hole.

3. The electronic device according to claim 2, wherein
a plurality of the scrapers are formed spaced apart from one another along moving direction of the moving member, and
the plurality of the scrapers are formed to decrease in size with decreasing distance to the dust discharge hole.

\* \* \* \* \*